(12) United States Patent
Cheung et al.

(10) Patent No.: US 7,483,886 B2
(45) Date of Patent: *Jan. 27, 2009

(54) SEARCH ENGINE ACCOUNT MONITORING

(75) Inventors: Dominic Dough-Ming Cheung, South Pasadena, CA (US); Scott A. Shifflett, Stevenson Ranch, CA (US); Darren J. Davis, Los Angeles, CA (US); Eugene F. Hu, Monrovia, CA (US); Scott W. Snell, Beverly Hills, CA (US); Peter Savich, Seattle, WA (US)

(73) Assignee: Yahoo! Inc., Sunnyvale, CA (US)

( * ) Notice: Subject to any disclaimer, the term of this patent is extended or adjusted under 35 U.S.C. 154(b) by 284 days.

This patent is subject to a terminal disclaimer.

(21) Appl. No.: 11/430,411

(22) Filed: May 9, 2006

(65) Prior Publication Data

US 2006/0206355 A1 Sep. 14, 2006

Related U.S. Application Data

(63) Continuation of application No. 10/108,745, filed on Mar. 28, 2002, now Pat. No. 7,043,471, which is a continuation-in-part of application No. 09/922,090, filed on Aug. 3, 2001, now Pat. No. 7,076,479.

(51) Int. Cl.
*G06F 17/30* (2006.01)
(52) U.S. Cl. ...................... 707/3; 707/5; 707/6; 707/10
(58) Field of Classification Search ....................... None
See application file for complete search history.

(56) References Cited

U.S. PATENT DOCUMENTS 5,659,732 A 8/1997 Kirsch ........................ 395/605

(Continued)

FOREIGN PATENT DOCUMENTS

WO WO 99/20486 9/1999

(Continued)

OTHER PUBLICATIONS

Correspondence dated May 2, 2006 including a summary and translation of an Office Action issued in Japanese counterpart application No. 2002-260580, including partial translation at the top of the p. 3 of reference 2, "Nikkei Webb Company", Nikkei business publishing company, Nov. 8, 2000, vol. 1, No. 2 p. 58-65 (in particular, p. 61), 8 pages.

(Continued)

*Primary Examiner*—Cam Y T Truong
(74) *Attorney, Agent, or Firm*—Brinks Hofer Gilson & Lione

(57) ABSTRACT

A system and method of generating an ordered search list via a search engine by determining various account balances to determine where a search listing will appear, if at all, in a search results list. If a web site advertiser's account is below a threshold, the search listing associated with the advertiser will not appear in the search list. Various balances may be used. Some of the balances may be closer to real-time balances and others may be more accurate, for example by removing certain event charges that were later determined to be non-chargeable. By using and monitoring the various account balances, the search engine prevents over-delivery of advertising through search result listings and possible over-billing of the advertisers.

2 Claims, 9 Drawing Sheets

U.S. PATENT DOCUMENTS

| | | | | |
|---|---|---|---|---|
| 5,717,923 | A | 2/1998 | Dedrick | 396/613 |
| 5,724,424 | A | 3/1998 | Gifford | 380/24 |
| 5,724,521 | A | 3/1998 | Dedrick | 395/226 |
| 5,724,524 | A | 3/1998 | Hunt et al. | 395/237 |
| 5,748,954 | A | 5/1998 | Mauldin | 395/610 |
| 5,752,238 | A | 5/1998 | Dedrick | 705/14 |
| 5,768,521 | A | 6/1998 | Dedrick | 395/226 |
| 5,778,367 | A | 7/1998 | Wesinger, Jr. et al. | 707/10 |
| 5,794,210 | A | 8/1998 | Goldhaber et al. | 705/14 |
| 5,826,241 | A | 10/1998 | Stein et al. | 705/26 |
| 5,832,428 | A | 11/1998 | Chow et al. | 704/254 |
| 5,848,397 | A | 12/1998 | Marsh et al. | 705/14 |
| 5,848,407 | A | 12/1998 | Ishikawa et al. | 707/2 |
| 5,852,820 | A | 12/1998 | Burrows | 707/2 |
| 5,855,008 | A | 12/1998 | Goldhaber et al. | 705/14 |
| 5,862,223 | A | 1/1999 | Walker et al. | 705/50 |
| 5,864,845 | A | 1/1999 | Voorhees et al. | 707/5 |
| 5,864,846 | A | 1/1999 | Voorhees et al. | 707/5 |
| 5,890,147 | A | 3/1999 | Peltonen et al. | 707/1 |
| 5,903,882 | A | 5/1999 | Asay et al. | 705/44 |
| 5,918,014 | A | 6/1999 | Robinson | 395/500.49 |
| 5,920,854 | A | 7/1999 | Kirsch et al. | 707/3 |
| 5,920,859 | A | 7/1999 | Li | 707/5 |
| 5,933,811 | A | 8/1999 | Angles et al. | 705/14 |
| 5,963,924 | A * | 10/1999 | Williams et al. | 705/40 |
| 5,991,747 | A | 11/1999 | Tomoyuki et al. | 705/41 |
| 6,041,326 | A | 3/2000 | Amro et al. | 707/10 |
| 6,070,158 | A | 5/2000 | Kirsch et al. | 707/3 |
| 6,078,866 | A | 6/2000 | Buck et al. | 702/2 |
| 6,119,096 | A | 9/2000 | Mann et al. | 705/5 |
| 6,169,992 | B1 | 1/2001 | Beall et al. | 707/103 R |
| 6,182,065 | B1 | 1/2001 | Yeomans | 707/3 |
| 6,247,043 | B1 | 6/2001 | Bates et al. | 709/200 |
| 6,253,198 | B1 | 6/2001 | Perkins | 707/3 |
| 6,269,361 | B1 * | 7/2001 | Davis et al. | 707/3 |
| 6,285,987 | B1 | 9/2001 | Roth et al. | 705/27 |
| 6,437,812 | B1 * | 8/2002 | Giles et al. | 715/853 |
| 6,557,007 | B1 | 4/2003 | Pekowski et al. | 707/104.1 |
| 6,578,079 | B1 | 6/2003 | Gittins | 709/229 |
| 6,628,954 | B1 | 9/2003 | McGowan et al. | 455/461 |
| 6,678,664 | B1 * | 1/2004 | Ganesan | 705/39 |
| 7,043,471 | B2 | 5/2006 | Cheung et al. | 707/3 |
| 7,076,479 | B1 | 7/2006 | Cheung et al. | 707/3 |
| 2002/0004735 | A1 | 1/2002 | Gross | 705/10 |
| 2002/0069156 | A1 | 6/2002 | Adam et al. | 705/37 |
| 2003/0055743 | A1 | 3/2003 | Murcko | 705/26 |

FOREIGN PATENT DOCUMENTS

| | | |
|---|---|---|
| WO | WO 99/48028 | 9/1999 |
| WO | WO 00/16218 | 3/2000 |
| WO | WO 00/41090 | 7/2000 |

OTHER PUBLICATIONS

"Nikkei Web Company", Nikkei business publishing company, Nov. 8, 2000, vol. 1, No. 2 p. 58-65 (in particular, p. 61), 10 pages.

Database of Corporate ResourceNet,"New Service Puts An Auction Search Engine Under One Roof", Electronic Advertising & Marketplace Report, vol. 12, Issue 8, Apr. 1998, p. 6.

Espe, "Online Search Engines Start To Charge For Listings", Washington Business Journal, vol. 18, Issue 1, May 1999, p. 31.

Dawson et al., "2 Search Sites Narrow Their Parameters", Adweek-Western Edition, vol. 48, Issue 42, Oct. 1998, p. 1.

Database of Corporate ResourceNet, "Bits", from Adweek-Eastern Edition, vol. 40, Issue 14, Apr. 1999, p. 46.

Komando, "Searching For Search Engines—from Dogpile to Deja News", Business First-Colombus, vol. 14, Issue 43, Jun. 1998, p. 46.

Database of Corporate ResourceNet, New services Aim to Boost Efficiency of Search Engines, Electronic Advertising & Marketplace Report, vol. 12, Issue 13, Jun. 1998, p. 6.

Database of Corporate ResourceNet, "Goto.com Chooses Quest's SharePlex(R) for Oracle Software to Ensure Uptime for Business-Critical Web Site", PR Newswire, Jun. 2000.

Database of DialogClassic(m), :Homestead Technologies' Continued Success Draws $17.50 Million In second Round of Venture Funding, PR Newswire, Apr. 1999.

"Frequently Asked Questions NT Image Search & Retrieval (IS &R)", by US Patent & Trademark Office, Dec. 1997.

"Chapter 1-Introduction to Dialog", by Dialog Information Service, Inc. pp. 1-1 to 1-14.

"Automated Patent System (APS) Workstation Reference Manual", by US Patent & Trademark Office, Jul. 1996.

Frentzen, Jeff, "Help for Getting the World Out About Web Sites", PC Week, v14, n46, p. 27(1), Nov. 3, 1997.

Miller, Karen L., "Improve Your Ranking (Building Web Sites to Attract Web Searches)", Home Office Computer, v16, n1, p. 51(2) Jan. 1998.

Wingfiled, "Another Engine Takes Ads By The Click", from http://www.news.com?news/Item/0.4.1387,00/html, May 1996.

Wang, "Engines Battle Irrelevance of Results-New Search Service Hope To Fill The Void", by Internet World, Feb. 1998.

Mardesich, "Web Site Operators Pay for Top Billing-Search Engine Allows Site Sponsors to Buy Place On Special List", from Knight Ridder Newspapers, Mar. 1998.

Hilty, "GoTo.Hell-What Happens When On Line Search Engine Accepts Cash From Web Sites?" from http://www.ocweekly.com/link/archives/97/27/byte-3.11.98-1html, Mar. 1998.

Clark, "Start-Up Plans Internet Search Service Tying Results To Advertising Spending", from the Wall Street Journal, Feb. 1998.

"Going, Going . . . ", from A Closer Look of the Wall Street Journal-Marketplace, Apr. 1998.

"Coursey.com", David Coursey's Insider report on Personal Computing, the Internet and Communications, Mar. 18, 1998.

Glaser, "Who Will GoTo.com", from OnlinePress.com, Feb. 1998.

Mardesich, "Search Engine Charges Hit Sites", from http://www.sjmercury.com/business/center/goti022198.html, Feb. 1998.

Pelline, "Pay-for-placement gets another shot", from http://www.newscom.?news/item/0,4,19307,00.html, Sep. 1997.

Sara Fisher, "Budding Internet Firm Finds Niche in Satisfaction", L.A. Business Journal, Aug. 10, 1998.

"Disclosure Rules", The Industry Standard—The Newsmagazine of the Internet Economy, Aug. 10, 1998.

Margot Williams, "How To Ease Your Online Searches", Lansing State Journal, Jun. 1, 1998.

Sasha Alyson, "Searching The Search Engines", Front Page, May 8, 1998.

Advertising Age-Interactive Daily Homepage, Feb. 23, 1998, "Search Engine Startup To Auction Listings", obtained at the internet address http://www.adage.com/interactive/mdaily/index.html.

Brian McWilliams, PC World Online, Feb. 23, 1998, "Search Engine To Sell Top Positions On Results Lists", obtained at the internet address http://www.pcworld.com/news/daily/data/0298/9880223173204.html.

Search Engine Watch, Feb. 21, 1998, "GoTo Sells Positions", obtained at the internet address http://www.searchenginewatch.com/news.html, Feb. 23, 1998.

Jodi Mardesich, "Search Engine Charges Hit Sites", from http://wwww.sjmercury.com/businrss/center/goto022198.html, Feb. 1998.

Laurie J. Flynn, "With GoTo.com's Search Engine, The Highest Bidder Shall Be Ranked First", The New York Times, Mar. 1998, p. C1.

Laura Rich, Adweek Online IQ News Online, Feb. 23, 1998, "New Search Engine Allows Sites to Pay Their Way to Top", from http://www.adweek.com/iq/ iqnews02.asp, Feb. 1998.

Steven Vonder Haar, ZDNet,com, Feb. 19, 1998, "Searching For The Highest Bidder", obtained at the internet address http://www.zdnet.com/intweek/daily/980219.html, Feb. 23, 1998.

Jeff Pelline, "New Search Engine Goes Commercial", CNET News. com, from http://www.news.com/News/Item/0,4,19281,00.html, Feb. 20, 1998.

Nick Wingfield, Staff Writer, CNET News.com, Jun. 21, 1996, "Engine Sells Results, Draws Fire", obtained at the internet address http://www.news.com/News/Item/Textonly/0,25,1635,00.html, Jul. 29, 1999.

Nick Wingfield, Staff Writer, CNET News.com, May 22, 1996, "Another Engine Takes Ads by The Click", obtained at the internet address http://www.news.com/News/Item/0,4,1387,00.html, Jul. 29, 1999.

Rose Aguilar, Staff Writer, CNET News.com, Apr. 29, 1996, "New Ad Model Charges By The Click", obtained at the internet address http://www.news.com/News/Item/0,4,1199,00.html, Jul. 29, 1999.

Alex Lash, Staff Writer, CNET News.com, Dec. 11, 1996, "Open Text Updates Tools", obtained at the internet address http://www.news.com/News/Item/0,4,6118,00.html, Jul. 29, 1999.

I Seek It "The Next Generation Search Engine", May 21, 1999, obtained at the internet address http://www.iseekit.com.

Jeff Frentzen, "Help For Getting The Word Out About Web Sites", PC Week, Vo. 14, No. 46, Nov. 3, 1997, p. 27(1).

Smith, Laura B., article "Going . . . Gone", PC Week, vol. 13, No. 34, Aug. 26, 1996, p. E1 (2), http://www.dialog-classic.com/DialogClassic/dialog.

Press Release article titled "GoTo.com Announces First round of Financing, Totaling More Than $6 Million, Led by Draper, Fisher Jurvetson", *Business Wire*, dated May 19, 1998, printed from the Internet at <http://www.dialogclassic.com/main.vingw> on Nov. 9, 2000, 2 pages.

News of The Week articles, *Telephony*, May 1, 1995, pp. 8 and 10.

Nuts 'N Bolts articles, *Target Marketing*, Oct. 1997, 1 page.

DoubleClick TestIt!, obtained at the internet address: http://web.archive.org/web/19980205034316/www.doubleclick.com/nf/adinfo/testiset.htm, dated Oct. 16, 2002, 4 pages.

DoubleClick Frequently Asked Questions, obtained at the internet address: http://web.archive.org/web/19980205033925/www.doubleclick.com/nf/adinfo/facts.htm, dated Oct. 16, 2002, 5 pages.

Google Search, communication from Jeffrey Brewer at Jeffrey@goto.com, titled "Need reverse stemming software", dated May 27, 1998, obtained at the internet address: http://groups.google.com/groups?selm=356CEE4A8DE882A8%40goto.com, on Dec. 19, 2002, 1 page.

Ketchpel, Steven P. et al. "U-PAI: A Universal Payment Application Interface", conference material article from the Second USENIX Workshop on Electronic Commerce Proceedings, Oakland, California, Nov. 18-21, 1996, 17 pages.

Schwartz, Randal L., "Click-Through Tracking in Perl", *Web Techniques*, dated May 1998, located at the internet address: www.webtechniques.com, 3 pages.

Van Roeden, Adriaan, "Your Own Search Engine With SWISH, A Custom Search Facility For Your Web Site", *Web Techniques*, dated Nov. 1996, located at the internet address: www.webtechniques.com, pp. 63-66 pages.

Full Catalog—Categories Menu, Sun Microsystems Sun Solutions Catalog, obtained at the internet address: http://web.archive.org/web/19981205110211/solutions.sun.com/catalogs/all/index.htm, printed on Dec. 19, 2002, 2 pages.

Help on Making Queries—Search by Company or Product, obtained at the internet address: http://web.archive.org/web/19981203050002/solutions.sun.com/search-help.htm, printed on Dec. 19, 2002, 4 pages.

Online Updating, Sun Microsystems Sun Solutions Catalog obtained at the internet address: http://web.archive.org/web/19990220190636/solutions.sun.com/editmodule/help.html, printed on Dec. 19, 2002, 2 pages.

Karen Swann & Debbie Evans, "APS Search Tools: Everything you wanted to know, but were afraid to ask . . . " Sep. 17, 1997.

Jeff Frentzen, "Help for getting the word out about Web sites," PC Week, Nov. 3, 1997.

Kim Komando, "Searching for Search Engines—From Dogpile to Deja News," Business First-Columbus, Jun. 19, 1998.

G. David Doran, "Search Engines . . . Their popularity, their secrets, their flaws," Entrepreneur, Jul. 1998.

* cited by examiner

SEARCH ENGINE ACCOUNT MONITORING

RELATED APPLICATIONS

This application is a continuation of application Ser. No. 10/108,745, filed Mar. 28, 2002, issued as U.S. Pat. No. 7,043,471 on May 9, 2006, which is a continuation in part of application Ser. No. 09/922,090 filed Aug. 3, 2001 now U.S. Pat. No. 7,076,479, which applications are incorporated herein in their entirety by this reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The transfer of information over computer networks has become an increasingly important means by which institutions, corporations, and individuals do business. Computer networks have grown over the years from independent and isolated entities established to serve the needs of a single group into vast internets which interconnect disparate physical networks and allow them to function as a coordinated system. Currently, the largest computer network in existence is the Internet. The Internet is a worldwide interconnection of computer networks that communicate using a common protocol. Millions of computers, from low end personal computers to high end super computers, are connected to the Internet.

The Internet has emerged as a large community of electronically connected users located around the world who readily and regularly exchange significant amounts of information. The Internet continues to serve its original purposes of providing for access to and exchange of information among government agencies, laboratories, and universities for research and education. In addition, the Internet has evolved to serve a variety of interests and forums that extend beyond its original goals. In particular, the Internet is rapidly transforming into a global electronic marketplace of goods and services as well as of ideas and information.

This transformation of the Internet into a global marketplace was driven in large part by the introduction of an information system known as the World Wide Web ("the web"). The web is a unique distributed database designed to give wide access to a large universe of documents. The database records of the web are in the form of documents known as "pages." These pages reside on web servers and are accessible via the Internet. The web is therefore a vast database of information dispersed across countless individual computer systems that is constantly changing and has no recognizable organization or morphology. Computers connected to the Internet may access the web pages via a program known as a browser, which has a powerful, simple-to-learn graphical user interface. One powerful technique supported by the web browser is known as hyperlinking, which permits web page authors to create links to other web pages which users can then retrieve by using simple point-and-click commands on the web browser.

The pages may be constructed in any one of a variety of formatting conventions, such as Hyper Text Markup Language (HTML), and may include multimedia information content such as graphics, audio, and moving pictures. Any person with a computer and a connection to the Internet may access any publicly accessible page posted on the web. Thus, a presence on the web has the capability to introduce a worldwide base of consumers to businesses, individuals, and institutions seeking to advertise their products and services to potential customers, or to distribute or promote information. Furthermore, the ever increasing sophistication in the design of web pages, made possible by the exponential increase in data transmission rates and computer processing speeds, makes the web an increasingly attractive medium for advertising and other business purposes, as well as for the free flow of information.

The availability of powerful new tools that facilitate the development and distribution of Internet content has led to a proliferation of information, products, and services offered on the Internet and dramatic growth in the number of consumers using the Internet. International Data Corporation, commonly referred to as IDC, estimates that the number of Internet users will grow from approximately 97 million worldwide in 1998 to approximately 320 million worldwide by the end of 2002. In addition, commerce conducted over the Internet has grown and is expected to grow dramatically. IDC estimates that the percentage of Internet users buying goods and services on the Internet will increase from approximately 28% at the end of 1998 to approximately 40% in 2002, and that over the same period of time, the total value of goods and services purchased over the Internet will increase from approximately $32.4 billion to approximately $425.7 billion.

The Internet has emerged as an attractive new medium for businesses and advertisers of information, products and services to reach these large numbers of consumers. However, the web is composed of a seemingly limitless number of web pages dispersed across millions of different computer systems all over the world in no discernible organization. Search services or mechanisms, such as directories and search engines, have been developed to index and search the information available on the web and thereby help Internet users locate information of interest. These search services enable consumers to search the Internet for a listing of web sites based on a specific topic, product, or service of interest.

Search services are second only to e-mail as the most frequently used tool on the Internet. As a result, web sites providing search services offer advertisers significant reach into the Internet audience and give advertisers the opportunity to target consumer interests based on keyword or topical search requests. Advertisers, of course, have an interest in participating in search result listings. They generally seek to maximize exposure and traffic, while managing any costs associated with such exposure in an efficient and cost-effective manner.

Generally, in a web-based search on an Internet search engine, a user enters a search term comprising one or more keywords, which the search engine then uses to generate a listing of web pages that the user may access via a hyperlink. There are many ways in which a search engine can return the result listings. There are search engines that use automated search technology, which relies in large part on complex, mathematics-based database search algorithms that select and rank web pages based on multiple criteria such as keyword density and keyword location. These search engines frequently catalog search results that rely on invisible web site descriptions, or "meta tags", that are authored by web site promoters. It is not uncommon for web site owners to freely tag their sites as they choose in an attempt to attract additional consumer attention at little to no marginal cost. Other search engines and web site directories may also rely on manual efforts of limited editorial staffs to review web page information. No matter what the process, however, web page owners seek to target their web exposure and distribute information to the attention of interested users on a current and comprehensive basis, while maintaining costs or monitoring pre-determined budgets.

One known effort that has been used by advertisers to generate web site traffic is banner advertising, where web site promoters seeking to promote and increase their web exposure by purchasing space on the pages of popular commercial web sites. The web site promoters usually fill this space with a colorful graphic, known as a banner, advertising their own web site and acting as a hyperlink for a visitor to click to access the site. Banners may be displayed at every page access or may be targeted to search terms on a search engine. Like traditional advertising, banner advertising on the Internet is typically priced on an impression basis with advertisers paying for exposures to potential consumers.

Internet advertising can offer a level of targetability, interactivity, and measurability not generally available in other media. With the proper tools, Internet advertisers have the ability to target their messages to specific groups of consumers, receive prompt feedback as to the effectiveness of their advertising campaigns, and monitor any costs associated in the process. Many of the traditional paradigms of advertising and search engine algorithms fail to maximize the delivery of relevant information via the web to interested parties in a cost-effective manner for the advertiser. Ideally, web site promoters (advertisers) should be able to control their participation or placement in search result listings so that their listings appear in searches that are relevant to the content of their web site and any associated costs are effectively monitored. Search engine functionality needs to facilitate an on-line marketplace which offers consumers quick, easy and relevant search results while providing Internet advertisers and promoters with a more cost-effective way to target consumers and monitor costs. In this on-line marketplace, companies selling products, services, or information will appear in positions on a search result list generated by an Internet search engine for effective costs or spending allowances.

Since advertisers generally want to maximize results and minimize costs, advertisers have an incentive to select search keywords that are most relevant to their web site offerings and manage costs in using or promoting selected keywords. In one search engine model, for example, advertisers pay for each click through referral generated from the search result lists generated by the search engine. Such a search engine is described in U.S. Pat. No. 6,269,361, issued Jul. 31. 2001 to Davis, et al., and entitled "System and method for influencing a position on a search result list generated by a computer network search engine". The higher an advertiser's position on a search result list, the higher the likelihood that that advertiser will get a "referral." The likelihood that a consumer will be referred to the advertiser's web site through the search result list is directly related to the advertiser's position in the search result list.

The search engine provider may maintain accounts for each advertiser, also called a web site promoter. Because large numbers of charges may accrue for an account in a short period of time, maintaining an accurate and up-to-date account database is not only important, but can be invaluable. Existing account monitoring methods often result in advertisements being over-delivered and the advertiser's account being overcharged. Since advertisers may have established predetermined limits for certain charges, the search provider may not be reimbursed for the services provided to the advertiser beyond the advertiser's predetermined limit. Further, competing advertisers, which are paying for chargeable events after a competitor's limit has been reached, may be unnecessarily spending money for participation or priority placement in the search result listings if the non-paying advertiser's listing is still considered active.

BRIEF SUMMARY

An account monitoring system addresses the aforementioned problems or inefficiencies by providing a system and method that accurately manages a web site promoter's account with an Internet search engine provider. More particularly, the account monitoring system allows the search engine provider to provide account information notices to the various web site promoters and prevent over-delivery and overcharging for participation in a search engine. In application of the invention to an embodiment, the search engine charges the web site promoter on a chargeable event basis, adjusting for fraudulent charges.

DETAILED DESCRIPTION OF THE DRAWINGS AND THE PRESENTLY PREFERRED EMBODIMENTS

I. Introduction

Figure 1:
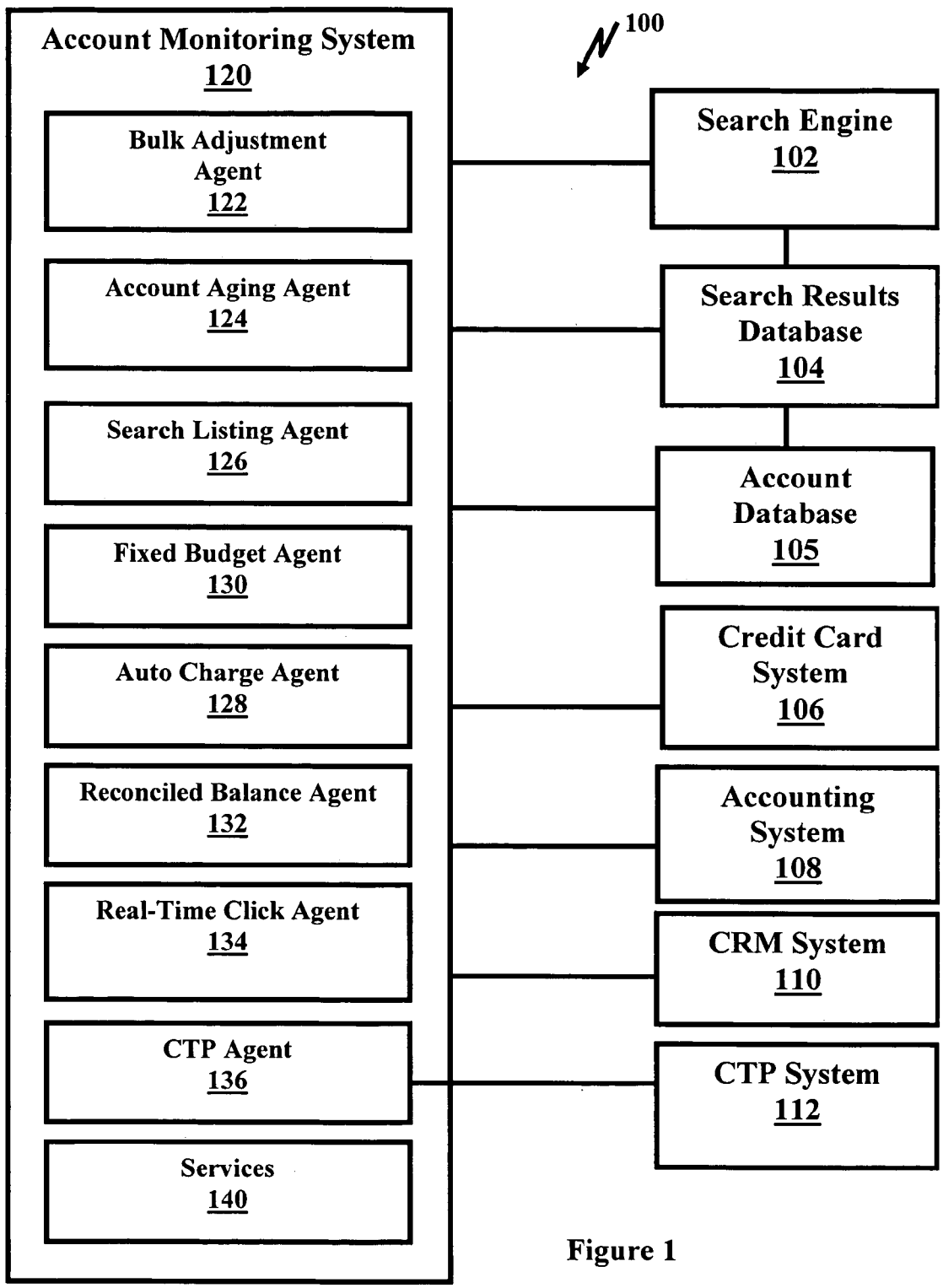
FIG. 1 is a block diagram illustrating an account monitor system.

Various novel methods and systems of account monitor for search engines are disclosed that reduce over-delivery of prioritized search results and reduce over-billing of advertisers. Because of the problems and inefficiencies with existing systems described above, a need exists for a search engine that more accurately monitors advertisers' accounts. Such a search engine account monitor may 1. recognize when an advertiser's account balance has reached a predefined limit; 2. factor in the effect of payments made by an advertiser to an account; 3. track chargeable event charges with minimal processing delay, in order to maintain current estimates of account balances; 4. disregard charges for non-chargeable events, e.g. in the event of fraudulent chargeable events; 5. incorporate definitive chargeable event charges for defined periods determined by a separate authoritative charge determination system that may use click filtering algorithms that have higher latency than acceptable for maintaining a most-current estimate of account balances, while "backing out" the effect of real-time monitored clicks for the same period; 6. incorporate definitive account balance information from an external financial accounting system; 7. charge and credit advertisers' credit cards or similar method of payment, record such charges, advise the financial accounting system of such charges, and consider such charges in calculating advertisers' account balances; 8. charge an advertiser's credit card or similar method of payment to replenish a depleted account whenever the account approaches a predetermined balance such as zero; 9. charge an advertiser's credit card to bring an account up to a prearranged balance at periodic intervals, for advertisers which elect this service; 10. notify advertisers when their account balance is estimated to be insufficient to support further chargeable event charges beyond a predetermined time period; 11. notify advertisers when their account is replenished by charging their credit card; and/or 12. notify the search engine account managers when various conditions occur.

The following description is presented to enable any person skilled in the art to make and use the invention. For purposes of explanation, specific nomenclature is set forth to provide a thorough understanding of the present invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

II. Definitions

Agent—A program that calls methods periodically to perform a specific task. Multiple agents can be run simultaneously to perform the same or different tasks.

CRM—Customer Relationship Management.

CSR—Customer Service Representatives.

Client—A member of a class or group that uses the services of another class or group to which it is not related. In the context of a computer network, such as the Internet, a client is a process (i.e. roughly a program or task) that requests a service which is provided by another process, known as a server program.

EJB—Enterprise Java Beans.

Fraud protection agent—A system that filters out fraudulent or questionable chargeable events. Such charges may be filtered out in a multi-step process using different filtering techniques.

Method—A program or process that may be grouped with other methods into a service. Methods are commonly executed by an agent.

RTC agent—Real-time click agent. A Real-time click agent listens to clicks at a web site and forward the data to a central server for account monitoring.

Search term—The terms in a search performed by a search engine.

Search result list—In a search service, the search result list is a list of the search results ordered and returned to the user by the search engine.

Server—A remote computer system that is accessible over a communications medium such as the Internet. A server may acts as an information provider for a computer network.

Service—A collection of methods.

URL—Uniform Resource Locators.

Web site—A page or set of pages accessible via the World Wide Web.

Web site promoters—An entity that wishes to promote a particular web site, also known as an advertiser. A web site promoter is typically an owner, operator, or agent of the web site.

III. Exemplary Embodiment

Internet search engines provide a way for web site advertisers to promote their web sites in search results or gain exposure by appearing in search results containing their web site description. A tool enabling advertisers to participate in search result listings for searches on terms relevant to their business while more accurately monitoring costs associated with the participation provides a powerful advantage to businesses and others seeking to manage costs associated with increase in web exposure. Although the account monitoring system described herein can be applied to many different search engine models, it is helpful for purposes of description to detail the system as used in connection with a pay-for-placement model explained below.

To participate in the process as applied to a pay for placement model search engine, an advertiser, such as a web site promoter, may access the advertiser's user account through a secure web site. The advertiser may use the account to place a priced amount on search terms that are relevant to the advertiser's web site. Each priced amount is specific to a search term-web site combination and corresponds to a money amount that the advertiser will pay to the owner of the search engine each time a searcher clicks on the advertiser's hyperlinked listing in the search result list generated by the search engine. In alternative embodiments, the advertiser may place a priced amount on other chargeable events, such as display of the advertiser's search listing to a searcher, a referral to the advertiser's web site, or some subsequent searcher action at the advertiser's web site such as on-line purchase of a good or service by the searcher. The searcher's click will result in an access request being sent to the advertiser's web site, which will respond by transmitting the advertiser's web page to the searcher's browser. The charge to the advertiser for the placement is therefore directly proportional to the benefit received, since the charge is based on the number of referrals to the advertiser's web site that were generated by the search engine.

The higher the priced amount or bid, the more advantageous the placement in the search result list that is generated when the bidded search term is entered by a searcher using the search engine. More advantageous positioning is provided, in one embodiment, by placing the advertiser's respective search listing higher in the search results or nearer the top of the list of search results. In other embodiments, the advertiser's listing may be displayed separate from the list of search results or even in a separate web browser window. In one exemplary embodiment, the search result list is arranged in order of decreasing bid amount, with the search listing corresponding to the highest bids displayed first to the searcher. Each search listing corresponding to a bid may be identified on the display as a paid listing. The bid amount may be included with the search listing. In addition, the search result list of the exemplary embodiment is preferably combined with "non-paid" web site descriptions generated by a conventional Internet search engine, preferably including listings generated according to mathematics-based database search algorithms as discussed above. The combination of paid and unpaid listings helps ensure that the searcher will receive the most complete and relevant search results. The non-paid listings are considered to have a bid amount of zero and are therefore listed separately or underneath the paid results.

In the exemplary embodiments described herein, the web site promoters may influence a position for a search listing within a search result list generated by an Internet search engine. The web site promoter first selects a search term comprising one or more keywords relevant to the content of the web site to be listed. The web site promoter influences the rank position for the search listing through an ongoing online competitive bidding process with other web site promoters. The bidding process occurs when an advertiser enters a new bid amount for an existing search listing or enters a bid amount for a new search listing. Preferably, the promoter's bid is then processed substantially in real time. This bid amount is compared with all other bid amounts from other promoters for the same search term, and generates new rank values for all search listings having that search term. The rank value determines the position where the promoter's web site description will appear on the search results list page that is generated when the search term is entered into the query box on the search engine by a searcher. A higher bid will result in a higher rank value and a more advantageous placement, which is preferably near the beginning of the search results list page. Preferably, the quantity used in the competitive bidding process is a money amount that the web site promoter will pay to an owner of the Internet search engine each time the advertiser's web site is referred by the search engine. Most preferably, this money amount will be deducted from an account balance that is retained in the promoter's account for each time the promoter's web site is referred by the search engine.

Each account includes contact and billing information for a web site promoter. In addition, each account includes at least one search listing, each search listing having five components: a description of the web site to be listed, the Uniform Resource Locator (URL) of the web site, a search term comprising one or more keywords, a bid amount, and a title for the search listing. Each account may also include the promoter's payment history and a history of search listings entered by the user. The promoter logs in to his or her account via an authentication process running on a secure server. Once logged in, the promoter may add, delete, or modify a search listing. The functions of adding or deleting a search listing, or modifying the bid amount of a search listing is to initiate the competitive bidding process described above. All search listing changes and modifications are processed substantially in real time to support the online competitive bidding process.

While described in connection with exemplary embodiments that may be referred to as pay for placement systems, the method and apparatus described herein may be applied to any suitable type of database or search engine system.

IV. Seniority

When multiple advertisers seek participation or inclusion in the search result listings for the same search term, the order that those advertisers appear in the search results is generally based on a relative relevance methodology. This ordering can be inaccurate or affected by information maintained by the search engine. For example, in the pay-for-performance model, an advertiser who placed their bid earliest may be given priority (listed higher) than other advertisers who placed their bids later. If an advertiser changes their bid, either by increasing the bid or reducing the bid, that advertiser's seniority may be reset to the time the bid value was changed. If an account is taken off-line, for example for failure to fund a pre-pay account, the account may lose its seniority. In such a case, the account may be given seniority as of when comes back online. Optionally, if the account was turned off erroneously, the account may keep its original seniority for all of the account's search terms. The status update time may be unaffected when an account goes from "ON" to "PROVISIONALLY OFF," or from "PROVISIONALLY OFF" to "ON." The status update time may be updated only when the account goes from "ON" to "OFF," "OFF" to "ON," or "PROVISIONALLY OFF" to "OFF."

In one embodiment, seniority may be determined using the following process. First, a "bid time" for each bid for an account is set to the time when the bid was originally placed. If the bid is changed, the bid time reset to the time when the bid was changed. Second, an account's "status update time" is set to the time when an account goes online or offline. The seniority, also called the "effective bid time" is the most recent of the bid time and status update time. By maintaining both the bid time and the status update time, all the bids for an account may be taken off-line by adjusting the status update time and an account that was erroneous turned-off can be restored to its proper seniority by resetting the account's status update time.

V. Account Monitoring System

FIGS. 1 to 9 represent various aspects of an account monitoring system for use with an Internet search engine. Referring to FIG. 1, a block diagram 100 illustrates an account monitoring system 120 for use with an Internet-based search engine. The account monitoring system 120 may comprise a set of software applications or subroutines for example, agents and services. The agents may include a bulk adjustment agent 122, an account aging agent 124, a search listing agent 126, an auto charge agent 128, a fixed budget agent 130, a reconciled balance agent 132, a real-time event agent 134, and a fraud protection agent 136. The services 140 may include the services described with reference to FIG. 9, which include a payment service 910, a credit card service 920, and an account service 930.

The account monitoring system 120 may interface with various other applications and systems, for example, a search engine 102, a search results database 104, a credit card system 106, an accounting system 108, a CRM system 110, and a fraud protection system 112.

The bulk adjustment agent 122 allows automatic adjustments to account balances based on internal account management or external data. The bulk adjustment agent 122 may make adjustments based on some business rules that affect multiple accounts. For example, the bulk adjustment agent 122 can determine which accounts did not meet a minimum charge level for a period and adjust the charges for that account for that period to the minimum level. In one embodiment, the bulk adjustment agent 122 calls a "process adjustments" method that retrieves information from the accounting system 108 and other systems via a drop box and sends the information to the account database 105. The other systems may include an ad hoc entry system and the CRM system 110.

The account aging agent 124 determines which accounts have a status that changed, for example from "NEW" to "OLD." An account may be old 30 days after it goes on-line. Alternatively, various business rules may be used to determine the age of an account. In one embodiment, the account aging agent 124 calls a "monitor account" method after an account is changed.

The search listing agent 126 propagates the account status of the various accounts to the search result database. The status of the accounts may be propagated to all the serving sites when multiple serving sites exist. In an embodiment, the search listing agent 126 calls a "propagate account status"

method to retrieve the account status from the account database 105 and send the account status to the search result database 104. In an embodiment, the search listing agent 126 calls a "propagate account status" method that retrieves status information from the account database 105 and sends it to the search result database 104. The account status may indicated various characteristics about the account including whether the account is on-line or off-line and for which search terms the status applies, also the status may indicate the priced amounts.

The auto charge agent 128 automatically charges a credit card or similar method of payment account associated with an account in a non-stop payment plan. The various credit card accounts may be charged automatically when the associated account's balance falls below a pre-determined threshold, which can be based on run rate or fixed dollar amount, on a periodic basis, or via other methods. The auto charge agent 130 may use a charge card method to perform the credit card charge.

The fixed budget agent 130 charges credit card accounts associated with accounts that elected the fixed-budget payment plan. The fixed budget agent 130 may charge the credit card account associated with an account that has a fixed payment plan on the expiration date of the existing plan. The fixed budget agent 130 may use a charge card method to perform the credit card charge.

An advertiser that has not authorized automatic payments or payments via credit cards may add funds to their account by using conventional paper-based checks and other forms of payment. Additional funds may be added to such an advertiser's account in the Accounting System 108 through manual entry via a user interface. The account monitoring system 120 may be updated with such manually entered funds when the accounting system 108 exports authoritative balance information and the reconciled balance agent 134 successfully importing the authoritative balance into the account database 105.

The reconciled balance agent 132 processes data from the accounting system 108. The accounting system 108 may be any accounting system, such as Oracle Financial®. The accounting system 108 may use various business rules to adjust the balance of the account and turn an account on or off. In an embodiment, the reconciled balance agent 132 calls a "reconcile balances" method and retrieves information from the accounting system 108 via a drop box. The "reconcile balances" method sends the information to the account database 105. If one or more account statuses have changed, the "reconcile balances" method calls the "monitor account" method.

The real-time event agent 134 processes chargeable events in substantially real-time. The real-time event agent 134 then adjusts the working balance of the accounts associated with the events. In one embodiment, events correspond to clicks by a searcher on a displayed search listing of an advertiser. Other examples of an event that triggers a payment obligation include payment of consideration, inclusion of the advertiser's search listing in the search results provided to the searcher, referred to as an impression, or some action subsequently taken by the searcher. Examples of such an action include registering at the advertiser's web site after the searcher's browser has been redirected there; purchasing a good or service from the advertiser or a number of page views at the advertiser's web site that exceeds a specified threshold. Any type of action by the searcher that can be monitored and accounted for may be used as the basis for a chargeable event. For example, if an advertiser agreed to pay $0.95 per event for a search result from the keyword "pen," and the real-time event agent 134 detected 2 non-fraudulent events associated with the advertiser's web page, then the real-time event agent 134 would reduce the advertiser's working balance by $1.90.

The fraud protection agent 136 processes data from the fraud detection system, that is the fraud protection system 112. The fraud protection agent 136 adjusts the balance of the accounts and turns the accounts' status off according to various business rules. In an embodiment, the fraud protection agent 136 calls a "process definitive events" method the retrieves information from the fraud protection system 112 via a drop box. The "process definitive events" method sends the information to the account database 105. If one or more account statuses have changed, the "process definitive events" method calls the "monitor account" method. The account monitoring system 120 may include multiple fraud detection mechanism including the fraud protection agent 136.

Figure 2:
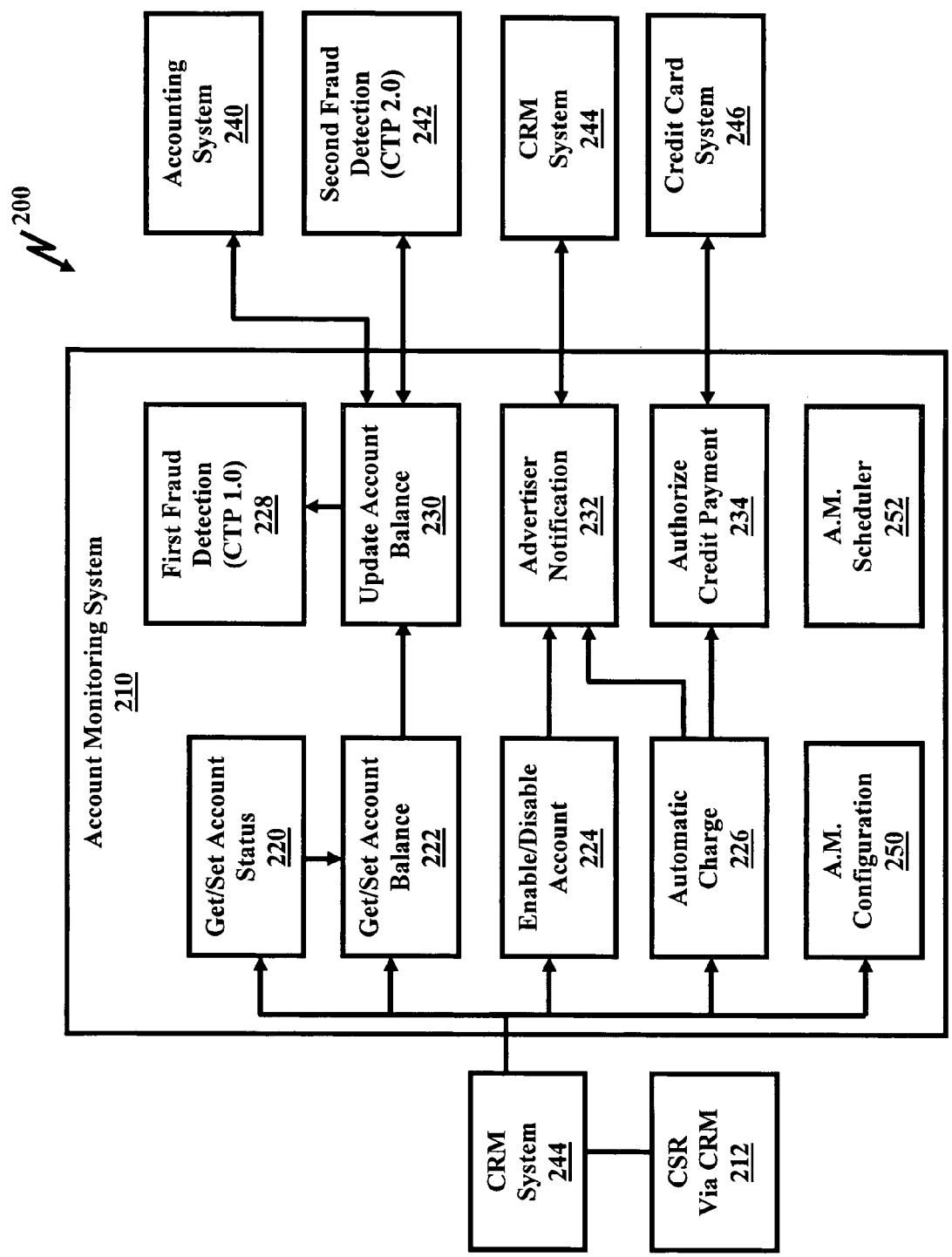
FIG. 2 is a block diagram illustrating an account monitor system.

Referring to FIG. 2, a block diagram 200 illustrates an account monitoring system 210. The account monitoring system 210 may comprise a set of software applications, methods, or subroutines for example, the account monitoring system 210 may include: a "get/set account status" method 220, a "get/set account balance" method 222, an "enable/disable account" method 224, an "automatic charge" method 226, an account monitoring configuration method 250, a first fraud detection method 228 (e.g. CTP 1.0), an "update account balance" method 230, an advertiser notification method 232, a credit payment authorization method 234, and an account monitor scheduler method 252. The "get/set account status" method 220 may be implemented as two separate methods, a get account status method and a set account status method, or combined together in to a single method. Like other methods shown in FIG. 2 may also be implemented with multiple methods. For example, the "get/set account balance" method 222 may include a get account balance and a set account balance, the "enable/disable account" method 224 may include an enable account and a disable account.

The account monitoring system 210 may interface with various other systems including an accounting system 240, a second fraud detection system 242 (e.g. CTP 2.0), a CRM system 244, and a credit card system 246. Customer service representatives ("CSR") 212 may access the account monitoring system 210 via the CRM system 244.

Referring to the account monitoring systems of FIGS. 1 and 2, the advertiser's accounts may be in one of three states. The three states are: 1. off-line, 2. on-line, and 3. off-line provisional. When an account is in the on-line state, the search listings associated with that account are served by the search engine. When an account is in the off-line state, the search listings associated with that account are not served by the search engine. When an account is in the off-line provisional state, the search listings associated with that account are not served by the search engine and they will not lose seniority when account comes back on-line.

The status of an account may be determined as a function of several factors. For example, the account status may be determined by the following parameters: life status, client request status, editorial status, internal status, cancellation status, finance status, auto settlement status, security status, and payment status. The life status may be "NEW" if the account that is less than 30 days old, "DEAD" if the account is deemed to be dead, for example the company went out of business, or "WORKING" if the account is more than 30 days old and not "DEAD."

The client request status indicates whether the advertiser (client) wishes their account to be active or not. For example, the client request status may be "ON," which is the normally status, when the advertiser wishes the account to be active and "OFF" when the advertiser explicitly requests the account to go off-line. The internal status may be "ON" under normal conditions or "OFF" when the account is turned off for reasons internal to the search engine provider.

The editorial status is used by the editor to turn off an account. When the editorial status is "ON," the editor has approved the account to go on-line. The editorial status is "OFF" when the editor has not yet approved the account. Accounts are created with editorial status set to "OFF." An editor may turn an account off because the search terms do not match the content of the web site or for other reasons.

The security status indicates the status of the credit card associated with an advertiser. The security status may be, for example, "ON-LINE-VERIFIED;" "OFF-LINE-FRAUDULENT;" "OFF-LINE-HIGH-RISK-PROVISIONAL;" "ON-LINE-HIGH-RISK;" or "ON-LINE-UNVERIFIED." The security status of "ON-LINE-VERIFIED" may be used when the credit card of the account is verified. The security status of "OFF-LINE-FRAUDULENT" may be used when the credit card of account is determined to be fraudulent. The security status of "OFF-LINE-HIGH-RISK-PROVISIONAL" may be used when the account is turned off due to high risk, or "ON-LINE-HIGH-RISK" may be used when the account is a high risk, but keep account on. The security status of "ON-LINE-UNVERIFIED" may be used when the account is kept on-line even though the credit card has not been verified. This may be the default security status for accounts created by salespersons. The security status of "OFFLINE-UNVERIFIED" may be used when the account is off-line because the credit card has not been verified. This may be the default security status for accounts that signed up through self-service, for example via the Internet.

The cancellation status indicates whether or not a client has cancelled the service. The cancellation status may be "ON" which is the normal setting or "OFF" when the account is cancelled by the client.

The finance status indicates whether the account is on line or off line based on a determination by the finance department of the search engine provider. The finance status may be "ON" which is the normal setting or "OFF" when the search engine provider's finance department wants account turned off.

The auto settlement status indicates whether the account is auto settled or not. The auto settlement status may be "ON" which is the normal setting or "OFF" when the account has been auto settled.

The payment status indicates the advertiser's payment status. The payment status may be "ON" when the account has money, "NEAR_EXCEED" when the account running out of money, "EXCEED" when the account is out of money, or "OFF" when the account is out of money and the account is turned off.

In an embodiment, the account status is "ON" if and only if the life status is "NEW" or "WORKING," the client status is "ON" and the editorial status is "ON," the internal status is "ON," the security status is "ON-LINE-VERIFIED;" "ON-LINE-HIGH-RISK;" or "ON-LINE-UNVERIFIED," the cancellation status is "ON," the finance status is "ON," the settlement status is "ON," the payment status is (not "OFF") or if the payment status is "OFF" and account is in the nonstop payment plan and credit card charge status is not "DECLINED," that is, non stop account has agreed to pay but we haven't have a chance to charge the account yet.

The account status may be "OFF-LINE-PROVISIONAL" if and only if the life status is "NEW" or "WORKING," the client status is "ON," the editorial status is "ON," the internal status is "ON," the security status is "OFF-LINE-HIGH-RISK-PROVISIONAL," the cancellation status is "ON," the finance status is "ON," the settlement status is "ON," the payment status is (not "OFF,") or (payment status is "OFF" and account is in the nonstop payment plan and credit card charge status is not "DECLINED" (i.e. non stop account has agreed to pay but we haven't have a chance to charge the account yet).

The account status may be "OFF" if and only if the life status is "DEAD," client status is "OFF," editorial status is "OFF," internal status is "OFF," security status is "OFF-LINE-FRAUDULENT," or "OFF-LINE-UNVERIFIED" cancellation status is "OFF," finance status is "OFF," settlement status is "OFF," or payment status is "OFF," and not (account is in the nonstop payment plan and credit card charge status is not "DECLINED" (i.e. non stop account has agreed to pay but we haven't have a chance to charge the account yet).

For accounts in the prepay deposit payment plan and prepay fixed budget payment plan, if the accounts definitive balance drops below zero due to definitive event charges, a positive adjustment/settlement is made to the account to bring the balance back to zero. When this occurs, the settlement status is set to "OFF." Without the settlement status, the account will remain on after a settlement, in cases where shutoff threshold amount less than zero. The settlement status goes back to "ON" only if the account's balance becomes positive again, e.g. due to a funding event.

VI. Balances

In an embodiment, several balances are determined for each account. They may include a working balance, a definitive balance, a reconciled balance, an estimated definitive balance, and a monitoring balance. If one or more of the balances exceeds a threshold, the search listing(s) associated with that account may not be included or placed in search lists generated by the search engine. For example, such a search listing may be ordered as if the respective priced amount for a given search term was zero. Alternative, the search listing may be ordered as if the respective priced amount for a given search term was above zero and below all the other non-zero priced amounts. Other consequences may also result from one or more of the balances exceeding (being above or below) a threshold.

A reconciled balance is a balance that may be generated by a financial system, for example the accounting system 108 of FIG. 1. The reconciled balance is meaningful when accompanied by the various timestamps associated with the underlying values used to determine the reconciled balance. The timestamps may include: an event charge timestamp, an adjustment timestamp, a credit card charge timestamp, and a publication timestamp. The publication timestamp is set to the time when the reconciled balance is generated. For example, the reconciled balance generated at 5 PM on Jul. 21, 2001, the publication timestamp for account "A" may be $30.25. This reconciled balance may include the charges, including event charges, up to the event charge timestamp time, for example 3 PM on Jul. 21, 2001, the credit card charges up to the credit card charge timestamp, for example, 4 PM on Jul. 21, 2001, and the adjustments up to the adjustment timestamp time, for example 4 PM on Jul. 21, 2001. A credit card charges is a deposits made by charging a credit card. When a reconciled balance is generated (published), the account monitor 210 recalculates the other balances. The other balances may be calculated as follows:

The definitive balance may be determined by starting with the reconciled balance and subtracting the definitive event charges since the event charge timestamp and adding the credit card charges and adjustments. See Eqn. 1.

Definitive balance=reconciled balance−definitive event charges the since event charge timestamp+ credit card charges since the credit card charge timestamp +adjustments since the adjustment timestamp    Eqn. 1

The working balance may be determined by starting with the definitive balance calculated via Eqn. 1 and subtracting the non-definitive event charges. See Eqn. 2.

Working balance=Definitive balance−non-definitive event charges since the event charge timestamp    Eqn. 2

The estimated definitive balance may be determined by starting with the reconciled balance and subtracting the definitive event charges since the event charge timestamp and the estimated definitive event charges and adding the credit card charges and adjustments. See Eqn. 3. The estimated definitive balance is essentially the definitive balance less an estimated amount of non-definitive event charges.

Estimated Definitive Balance=reconciled balance− definitive event charge since the event charge timestamp−estimated definitive event charges since the event charge timestamp+credit card charges since the credit card charge timestamp +adjustments since the adjustment timestamp.    Eqn. 3

The monitoring balance may be determined by taking the smallest value of the estimated definitive balance added to the account's credit limit and the remaining capital. See Eqn. 4

Monitoring balance=smaller of 1. the estimated definitive balance+credit limit; and
2. the remaining capital. Eqn. 4

The charges for the events may be analyzed by determining various event charges including a definitive event charges amount, a non-definitive event charges amount, and an estimated definitive event charges amount. Definitive event charges for an account may be the event charges for that account after the fraud protection system has filtered out the fraudulent event charges. The fraud protection system may filter out fraudulent event charges in a multiple stage process. The fraud protection system may use a large first-in-first-out queue of prior events, for example the queue may include up to 100,000 entries in a hash table format. Such a queue may be accessible to multiple event detection applications. The event detection applications may be executed at different geographic locations, for example California, the Mid-West, and the East Coast. Non-definitive event charges may be event charges from an RTC agent. The non-definitive event charges may have had some of the fraudulent event charges filtered out. The estimated definitive event charges may be the smallest amount of the following plus an offset: 1. the non-definitive event charges, for example $98 for 8-9 PM, 2. definitive event charge for example from 7-8 PM is $90, 3. estimated event charge based on account specific hourly run-rate, e.g. definitive event charge for example from 6-7 PM is $100, 4. estimated event charge for example from 8-9 PM=$80, and 5. optionally other criteria including non-linear criteria. For example, the estimated event charges based on the following traffic pattern: the definitive event charges from 7-8 PM is $90; the traffic from 8-9 PM is historically is 90% of traffic from 7-8 PM; the estimated event charge for 8-9 PM is $81 ($90 times 90%). The estimated event charges is the smallest of $98, $80, and $81, which is $80. This estimated event charges is then reduced by a fix dollar amount offset, e.g. $5. The resulting estimated event charges of $75.

The credit limit may apply to invoice capped accounts only. The credit limit for an account may be greater than or equal to zero dollars. The remaining cap is the remaining funds allocated for the current time period. Remaining cap may be greater than or equal to zero dollars or null. A null cap may mean an infinite credit limit.

VI. Business Rules for the Payment Status

Various business rules for the payment status determine the values of the following parameters: 1. the number of near exceed days allowed, 2. the near exceed amount, 3. the number of exceed days allowed, 4. the exceed amount, 5. the number of shutoff threshold days, 6. the shutoff threshold amount, 7. the number of autocharge days, and 8. the autocharge amount. These parameters may be expressed in days, converted into amount by days times run rate, a fix amount, or other value. The run rate of an account may be the average daily event charge for the most recent 3 days with activity.

The payment status may be determined from the near exceed, exceed and shutoff parameters. The value of the parameters may be uniquely determined by one or more of the following factors including: 1. account age; 2. payment plan, 3. client type, and 4. marketplace. The account age may be, for example "NEW" or "OLD." If the account is less than 30 days old then it is "NEW", otherwise the account is "OLD."

The payment plan may be invoice with a maximum amount (cap), invoice with no maximum amount, prepay deposit, prepay nonstop, prepay with a fixed spending budget. An invoice with a cap payment plan is an invoice account with a spending cap per time period. An invoice with no cap payment plan is an invoice account with no spending cap or limit. A prepay deposit payment plan is a prepay account with a fixed deposit amount and will not pay for any event s exceeding the deposit amount. A prepay nonstop payment plan is a prepay account that is replenished by the account monitor by charging the account's default credit card when it's monitoring balance falls below the auto charge days times the run rate or auto charge amount. A prepay fixed budget payment plan is a prepay account that is replenished at a certain time of a month to a predetermined amount. For example, if the account monitoring balance=$25 with a replenishment amount of $100, a charge card charge of $75 is added to the account bring the balance to the replenishment amount of $100.

The client type for an account may be "salesman generated" or "on-line generated" depending on how the account was originally open. The marketplace of the account may be the country of the account, advertiser, web site, for example, US, UK, Japan, etc. Alternatively, the market may be another market division such as the technology field of the advertiser, for example retail electronics, retail clothes, wholesale plumbing supplies.

Web site promoters may be periodically notified of their account status. A web site promoters may be automatically notified via e-mail about certain payment status transitions, overall account status change, and credit card charges. The e-mail template may vary depending on the marketplace, payment plan, client type, and account age VIII. Event Charge Buckets The event charge bucket table is used to keep track of recent event charges aggregated by account and time period. The tables may have the following fields: account$_{13}$ id, time period, event charge amount, and a flag that indicates whether the amount has been fraud filtered by CTP2.0 developed by GoTo.Com. The buckets in the event charge bucket table are updated by various agents including the RBT agent, the CTP agent, and the RTC agent. The RTC agent may perform the following: for each event, event charges are added to the bucket corresponding to the account and time period, as long as no definitive event charges have been received for that period. The fraud protection agent may perform the following: for each account, the flag is changed to "fraud protection processed", and the non-definitive event charge amount is replaced with the definitive event charge amount. The RTB agent may perform the following: for each account, all the definitive and non-definitive event charges for events already included in the reconciled balance (based on event charge timestamp in the reconciled balance feed) are deleted.

IX. Method of Monitoring an Account

Figure 3:
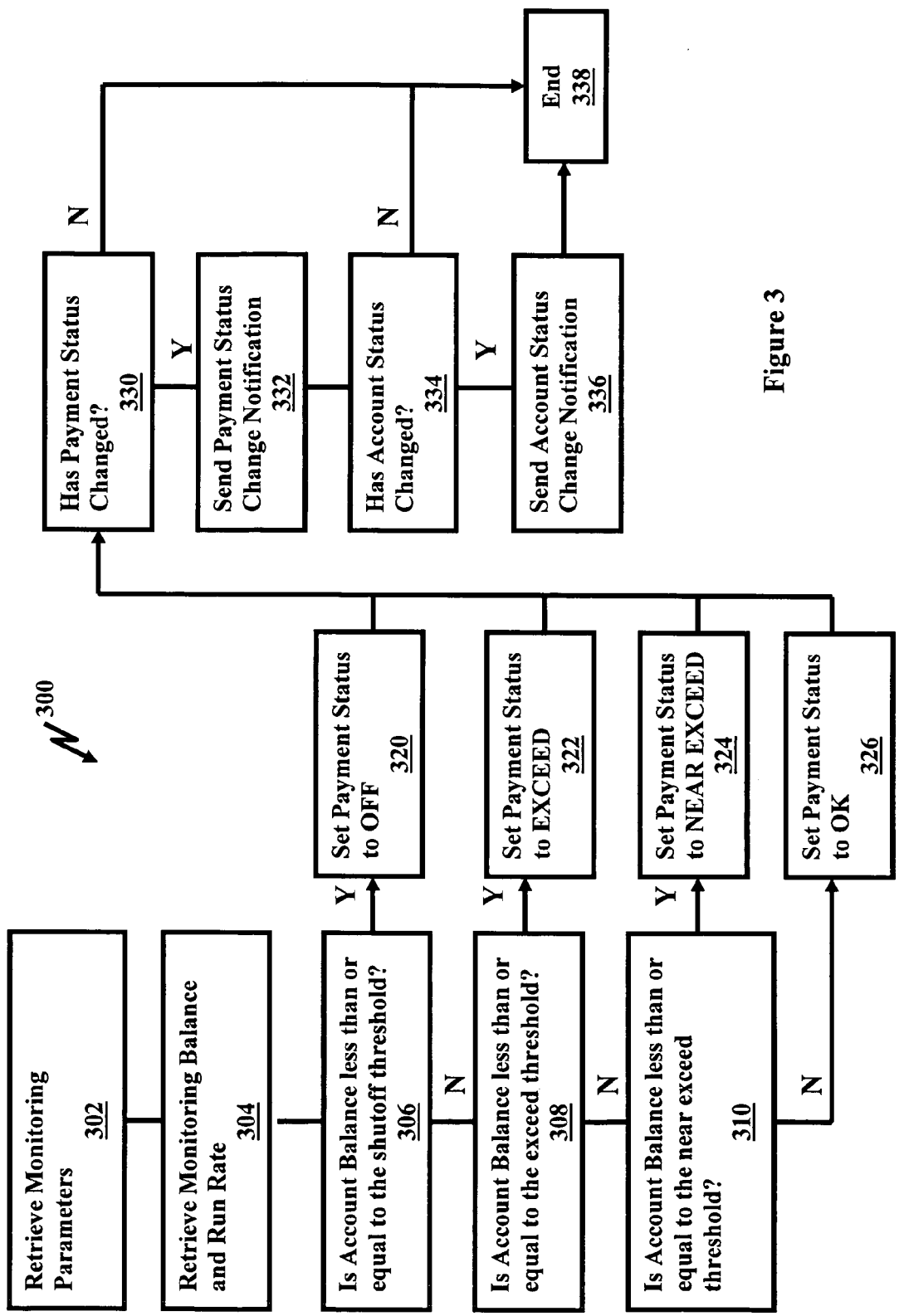
FIG. 3 is a flow chart illustrating a method of account monitoring.

Referring to FIG. 3, a flow chart illustrates a method 300 of monitoring an account.

In block 302, various monitoring parameters are retrieved.

In block 304, various monitoring balances and run rates are retrieved.

In block 306, the account balance is compared to shutoff threshold. If the account balance exceeds the shutoff threshold then in block 320 the payment status is set to a value of "OFF." If the account balance equals or is less than the shutoff threshold then block 308 is executed.

In block 308, the account balance is compared to the "exceed" threshold. If the account balance exceeds the "exceed" threshold then in block 322 the payment status is set to a value of "EXCEED." If the account balance equals or is less than the "exceed" threshold then block 310 is executed.

In block 310, the account balance is compared to the "near exceed" threshold. If the account balance exceeds the "near exceed" threshold then in block 324 the payment status is set to a value of "NEAR EXCEED." If the account balance equals or is less than the "near exceed" threshold then in block 326 the payment status is set to "OK."

After the payment status has been set to "OFF"; "EXCEED"; "NEAR EXCEED"; or "OK", in block 330, the payment status is evaluated to determine if a change in the status has occurred. If the payment status has not changed, the process is complete as represented by block 388. If the payment status has changed, then block 332 is executed. In block 332, a "payment status change" notification is sent to the web site promoter associated with that account. Then in block 334, the account status is evaluated to determine if the account status has changed. If the account status has not changed, the process is complete as represented by block 388. If the account status has changed, in block 338 an "account status changed" notification is sent to the he web site promoter associated with that account.

X. Application of the System

Figure 4:
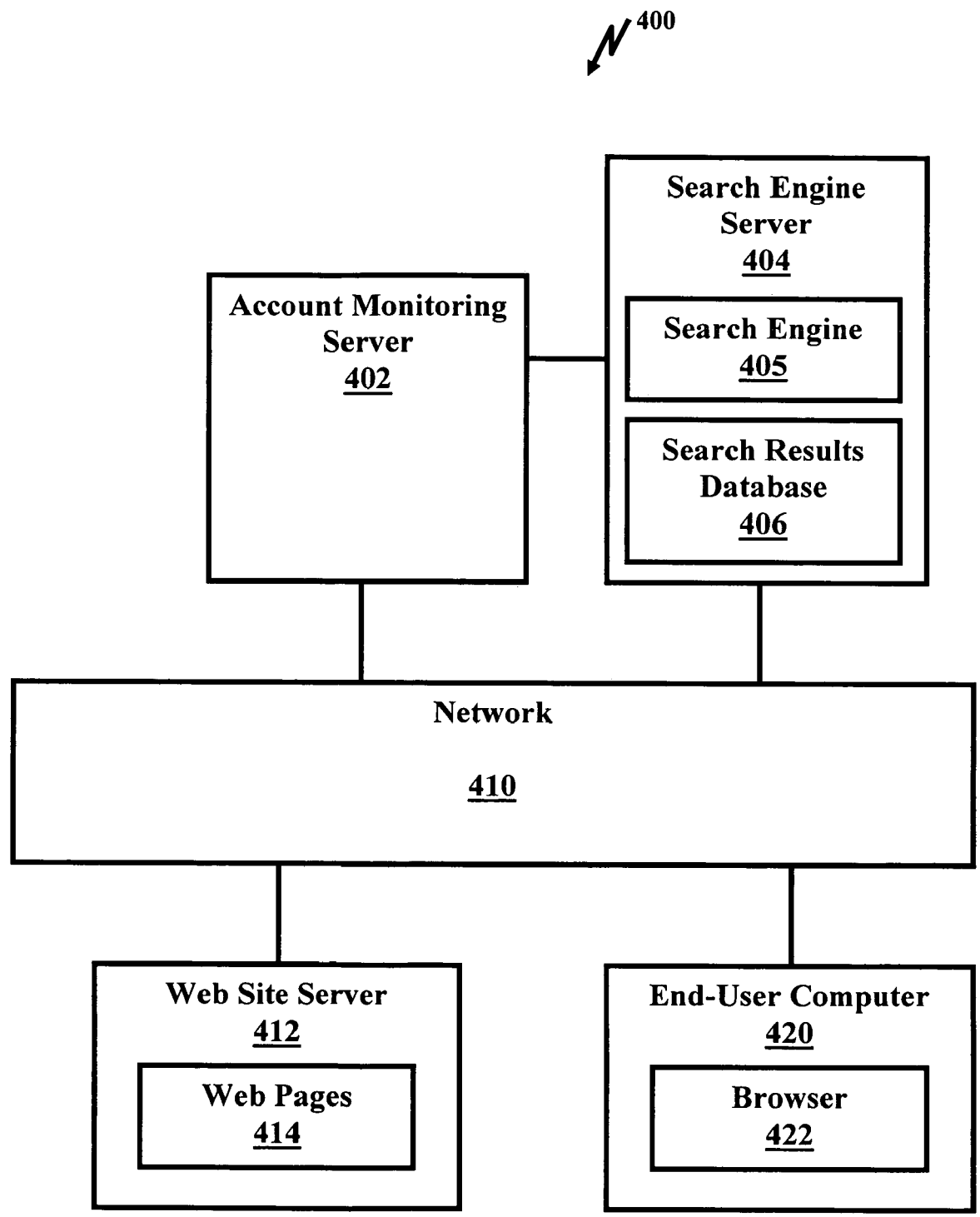
FIG. 4 is a block diagram illustrating a network environment including an account monitor.

Referring to FIG. 4, a network environment 400 including an account monitor server 402. An end-user at an end-user computer 420 having a browser 422 may search the network 410 for web sites and web pages 414 using a search engine 404. The end-user enters search terms on a web page associated with the search engine server 404. The search engine server 404 then access a search results database 406 and provides the search results to the end-user's browser 422. The search results may include links to various web pages 414. The search engine server 404 interfaces with the account monitoring server 402 to track the fees associated with the end-user's search or the resulting click-through(s) to the websites. The web site promoter's account on the account monitoring server 402 is then adjusted accordingly.

An end-user may access the search engine over a computer network 410, such as the Internet, for example by using a web browser, such as Netscape's NAVIGATOR®, Microsoft's INTERNET EXPLORER®, or MOSAIC® to locate web pages stored on web advertiser's server. A browser allow the users to enter addresses of a web page. These addresses are referred to as Uniform Resource Locators, or URLs. In addition, once a page has been retrieved, the browser program can provide access to other pages or records when the user "clicks" on hyperlinks to other web pages. Such hyperlinks are located within the web pages 30 and provide an automated way for the user to enter the URL of another page and to retrieve that page. The pages can be data records including as content plain textual information, or more complex digitally encoded multimedia content, such as software programs, graphics, audio signals, videos, and so forth.

The applications on the account monitoring server 402 and the search engine server 404 may follow a client/server architecture. The client process uses the requested service without having to know any working details about the other server program or the server itself. In networked systems, a client process usually runs on a computer that accesses shared network resources provided by another computer running a corresponding server process. However, it should also be noted that it is possible for the client process and the server process to run on the same computer. The client and server processes may even comprise different programs executing simultaneously on a single computer.

The network 410 will be hereinafter generally referred to as the Internet. Although the system and method of the present invention is specifically useful for the Internet, it should be understood that the computers may be connected together through one of a number of different types of networks. Such networks may include local area networks (LANs), other wide area networks (WANs), regional networks accessed over telephone lines, such as commercial information services, cellular networks, and other forms of networks. Preferably, the search engine server 404, account monitoring server 402, and web site servers 412 are interconnected via the World Wide Web.

Web site servers 412 may use the functionality provided by a HyperText Transfer Protocol (HTTP) or other communications protocols, such as FTP, SNMP, TELNET, and a number of other protocols.

The account monitoring server 402, also called an account management server, may comprises a computer storage medium or memory such as a hard disk or RAM. A database may be stored on the storage medium of the account management server. The database contains advertiser account information. It will be appreciated from the description below that the system and method of the present invention may be implemented in software that is stored as executable instructions on a computer storage medium such as memories or mass storage devices, on the account management server. Conventional browser programs, running on client computers, may be used to access advertiser account information stored on account management server. Preferably, access to the account management server is accomplished through a firewall, not shown, which protects the account management and search result placement programs and the account information from external tampering. Additional security may be provided via enhancements to the standard communications protocols such as Secure HTTP or the Secure Sockets Layer.

The search engine server 404 hosts a search engine program that permits network users, upon navigating to the search engine web server URL or sites on other web servers capable of submitting queries to the search engine web server through their browser program, to type keyword queries to identify pages of interest among the millions of pages available on the World Wide Web. In a preferred embodiment of the present invention, the search engine web server generates a search result list that includes, at least in part, relevant entries obtained from and formatted by the results of the bidding process conducted by the account management server. The search engine server 404 generates a list of hypertext links to documents that contain information relevant to search terms entered by the user at the client computer. The search engine server 404 transmits this list, in the form of a web page, to the network user, where it is displayed on the browser 422 running on the client computer. A presently preferred embodiment of the search engine server 404 may be at GoTo.com.

Search engine server's 404 search results database 406 comprises search listing records used to generate search results in response to user queries. In addition, search engine server 404 may also be connected to the account monitoring server 402. The account monitoring server 402 may also be connected to the network 410. The search engine server 404 and the account monitoring server 402 of the present invention address the different information needs of the end-users located at end-user computers 420.

For example, one class of users located at end-user computers 420 may be network information providers such as advertising web site promoters or owners having web pages 414 located on web site servers 412. These advertising web site promoters, or advertisers, may wish to access account information residing in storage on account monitoring server 402. An advertising web site promoter may, through the account residing on the account monitoring server 402, participate in a competitive bidding process with other advertisers. An advertiser may bid on any number of search terms relevant to the content of the advertiser's web site. In one embodiment of the present invention, the relevance of a bidded search term to an advertiser's web site is determined through a manual editorial process prior to insertion of the search listing containing the search term and advertiser web site URL into the search result database 406. In an alternate embodiment of the present invention, the relevance of a bidded search term in a search listing to the corresponding web site may be evaluated using a computer program executing on the account monitoring server 402, where the computer program will evaluate the search term and corresponding web site according to a set of predefined editorial rules.

The higher bids receive more advantageous placement on the search result list page generated by the search engine 405 when a search using the search term bid on by the advertiser is executed. In a preferred embodiment of the present invention, the amount bid by an advertiser comprises a money amount that is deducted from the account of the advertiser for each time the advertiser's web site is accessed via a hyperlink on the search result list page. A searcher "clicks" on the hyperlink with a computer input device to initiate a retrieval request to retrieve the information associated with the advertiser's hyperlink. Preferably, each access or "click" on a search result list hyperlink will be redirected to the search engine server 404 to associate the "click" with the account identifier for an advertiser. This redirect action, which is not apparent to the searcher, will access account identification information coded into the search result page before accessing the advertiser's URL using the search result list hyperlink clicked on by the searcher. The account identification information is recorded in the advertiser's account along with information from the retrieval request as a retrieval request event. Since the information obtained through this mechanism conclusively matches an account identifier with a URL in a manner not possible using conventional server system logs known in the art, accurate account debit records will be maintained. Most preferably, the advertiser's web site description and hyperlink on the search result list page is accompanied by an indication that the advertiser's listing is a paid listing. Most preferably, each paid listing displays a "cost to advertiser," which is an amount corresponding to a "price-per-click" paid by the advertiser for each referral to the advertiser's site through the search result list.

A second class of end-users at end-user computers 420 may comprise searchers seeking specific information on the web. The searchers may access, through their browsers 422, a search engine 405 residing on search engine server 404. The search engine' 405 search page may include a query box in which a searcher may type a search term comprising one or more keywords. Alternatively, the end-user may query the search engine server 404 through a query box hyperlinked to the search engine server 404 and located on a web page stored at a remote web server. When the searcher has finished entering the search term, the searcher may transmit the query to the search engine server 404 by clicking on a provided hyperlink. The search engine server 404 will then generate a search result list page and transmit this page to the searcher at the end-user computer 420.

The searcher may click on the hypertext links associated with each listing on the search results page to access the corresponding web pages 414. The hypertext links may access web pages anywhere on the Internet, and include paid listings to advertiser web pages 414 located on the advertiser's web site servers 412. In an embodiment, the search result list also includes non-paid listings that are not placed as a result of advertiser bids and are generated by a conventional World Wide Web search engine, such as the INKTOMI®, LYCOS®, or YAHOO!® search engines. The non-paid hypertext links may also include links manually indexed into the search result database 406 by an editorial team. Most preferably, the non-paid listings follow the paid advertiser listings on the search results page.

The bid amount preferably is a money amount bid by an advertiser for a listing. This money amount is deducted from the advertiser's prepaid account or is recorded for advertiser accounts that are invoiced for each time a search is executed by a user on the corresponding search term and the search result list hyperlink is used to refer the searcher to the advertiser's web site. Finally, a rank value is a value generated dynamically, preferably by the account monitoring server 402, each time an advertiser places a bid or a search enters a search query. The rank value of an advertiser's search listing determines the placement location of the advertiser's entry in the search result list generated when a search is executed on the corresponding search term. Preferably, rank value is an ordinal value determined in a direct relationship to the bid amount 358; the higher the bid amount, the higher the rank value and the more advantageous the placement location on the search result list. Most preferably, the rank value of 1 is assigned to the highest bid amount with successively higher ordinal values (e.g., 2, 3, 4, . . . ) associated with successively lower ranks and assigned to successively lower bid amounts.

"Account Administration" allows an advertiser, among other things, to view and change the advertiser's contact information and billing information, or update the advertiser's access profile, if any. Web-based forms well known in the art and similar to those discussed above are provided for updating account information.

The "Account Administration" menu also includes a selection enabling an advertiser to view the transaction history of the advertiser's account. Under the "View Transaction History" selection, the advertiser may invoke routines to view a listing of past account transactions (e.g., adding money to account, adding or deleting bidded search terms, or changing a bid amount). Additional routines may be implemented to permit advertisers to display a history of transactions of a specified type, or that occur within a specified time. The transaction information may be obtained from the audit trail list. Clickable buttons that may be implemented in software, web-based forms, and/or menus may be provided as known in the art to enable advertisers to specify such limitations.

In addition, "Account Administration" enables an advertiser to set notification options. Under this selection, the advertiser may select options that will cause the system to notify the advertiser when certain key events have occurred. For example, the advertiser may elect to set an option to have the system send conventional electronic mail messages to the advertiser when the advertiser's account balance has fallen below a specified level. In this manner, the advertiser may receive a "warning" to replenish the account before the account is suspended (meaning the advertiser's listings will no longer appear in search result lists). Another key event for which the advertiser may wish notification is a change in position of an advertiser's listing in the search result list generated for a particular search term. For example, an advertiser may wish to have the system send a conventional electronic mail message to the advertiser if the advertiser has been outbid by another advertiser for a particular search term (meaning that the advertiser's listing will appear in a position farther down on the search result list page than previously). When one of the system-specified key events occurs, a database search is triggered for each affected search listing. The system will then execute the appropriate notification routine in accordance with the notification options specified in the advertiser's account.

An advertiser may add money to the advertiser's account, so that the advertiser will have funds in their account to pay for referrals to the advertiser's site through the search results page. Preferably, only advertisers with funds in their advertiser's accounts may have their paid listings included in any search result lists generated. Most preferably, advertisers meeting selected business criteria may elect, in place of maintaining a positive account balance at all times, incur account charges regardless of account balance and pay an invoiced amount at regular intervals which reflects the charges incurred by actual referrals to the advertiser's site generated by the search engine.

When an advertiser wishes to "Add Money to Account" the account monitoring server receives data identifying the advertiser and retrieves the advertiser's account from the account database. The executing process then stores the advertiser's default billing information and displays the default billing information for the advertiser. The displayed billing information includes a default amount of money to be added, a default payment type, and default instrument information.

An advertiser may add funds online and substantially in real time through the use of a credit card, although the use of other payment types are certainly well within the scope of the present invention. For example, in an alternate embodiment of the present invention, advertisers may add funds to their account by transferring the desired amount from the advertiser's bank account through an electronic funds verification mechanism known in the art such as debit cards. In another alternate embodiment of the present invention, advertisers can add funds to their account using conventional paper-based checks. In that case, the additional funds may be updated in the account record database through manual entry. The instrument information includes further details regarding the type of payment. For example, for a credit card, the instrument information may include data on the name of the credit card (e.g., MasterCard, Visa, or American Express), the credit card number, the expiration date of the credit card, and billing information for the credit card (e.g., billing name and address). In a preferred embodiment of the present invention, only a partial credit card number is displayed to the advertiser for security purposes.

The default values displayed to the advertiser are obtained from a persistent state, e.g., stored in the account database. In an embodiment of the present invention, the stored billing information values may comprise the values set by the advertiser the last (e.g. most recent) time the process of adding money was invoked and completed for the advertiser's account. The default billing information is displayed to the advertiser in a web-based form. The advertiser may click on the appropriate text entry boxes on the web-based form and make changes to the default billing information. After the advertiser completes the changes, the advertiser may click on a hyperlinked "Submit" button provided on the form to request that the system update the billing information and current balance. Once the advertiser has requested an update, a function is invoked by the system which validates the billing information provided by the advertiser and displays it back to the advertiser for confirmation. The confirmation billing information is displayed in read-only form and may not be changed by the advertiser.

The validation step functions as follows. If payment is to be debited from an advertiser's external account, payment may be authenticated, authorized and completed. However, if the payment type is by credit card, a validating algorithm is invoked by the system, which validates the credit card number. The validating algorithm also validates the expiration date via a straightforward comparison with the current system date and time. In addition, the function stores the new values in a temporary instance prior to confirmation by the advertiser.

Once the advertiser ascertains that the displayed data is correct, the advertiser may click on a "Confirm" button provided on the page to indicate that the account should be updated. A function is invoked by the system which adds money to the appropriate account balance, updates the advertiser's billing information, and appends the billing information to the advertiser's payment history. The advertiser's updated billing information is stored to the persistent state (e.g., the account record database) from the temporary instance.

Within the function invoked, a credit card payment function may be invoked by the system. In an alternate embodiment of the present invention, other payment functions such as debit card payments may be invoked by defining multiple payment types depending on the updated value of the payment type.

If the payment type is credit card, the user's account is credited immediately, the user's credit card having already been validated. A screen showing the status of the add money transaction is displayed, showing a transaction number and a new current balance, reflecting the amount added by the just-completed credit card transaction.

In an alternate embodiment of the present invention, after the money has been added to the account, the amount of money added to the account may be allocated between sub-accounts the end of the add money process at step 616. If the advertiser has no subaccounts, all of the money in the account is a general allocation. However, if the advertiser has more than one subaccount, the system will display a confirmation and default message prompting the advertiser to "Allocate Money Between Subaccounts".

The menu selection "Allocate Money Between Subaccounts" may be invoked when money is added to the advertiser account, or it may be invoked within the "Account Management". The "Account Management" is accessible from the Advertiser Main Page. This "Allocate Money Between Subaccounts" menu selection permits an advertiser to allocate current and any pending balances of the advertiser's account among the advertiser's subaccounts. The system will then update the subaccount balances. The current balance allocations will be made in real time, while the pending balance allocations will be stored in the persistent state. A routine will be invoked to update the subaccount balances to reflect the pending balance allocations when the payment for the pending balance is processed. Automatic notification may be sent to the advertiser at that time, if requested. This intuitive online account management and allocation permits advertisers to manage their online advertising budget quickly and efficiently. Advertisers may replenish their accounts with funds and allocate their budgets, all in one easy web-based session. The computer-based implementation eliminates time consuming, high cost manual entry of the advertiser's account transactions.

The "Allocate Money Between Subaccounts" routine begins when an advertiser indicates the intent to allocate money by invoking the appropriate menu selection at the execution points indicated above. When the advertiser indicates the intent to allocate, a function is invoked by the system to determine whether there are funds pending in the current balance (i.e., unactivated account credits) that have not yet been allocated to the advertiser's subaccounts, and displays the balance selection options. In a preferred embodiment of the present invention, an account instance is created and a pending current balance account field is set from the persistent state.

If there are no unallocated pending funds, the system may display the current available balances for the account as a whole as well as for each subaccount. The advertiser then distributes the current available balance between subaccounts and submits a request to update the balances. A function is invoked which calculates and displays the current running total for subaccount balances. The current running total is stored in a temporary variable which is set to the sum of current balances for all subaccounts for the specified advertiser. The function also validates the new available subaccount balances to make sure that the total does not exceed the authorized amount. If the new advertiser-set available subaccount balances does not exceed the authorized amount, a function is invoked which will update all of the subaccount balances in the persistent state and display the update in read-only format.

If there are pending funds in the current account balance, the pending funds must be allocated separately from the available current balance. The pending funds will then be added into the available current balance when the funds are received. The function must therefore prompt the advertiser to choose between allocating pending funds or allocating available funds. The allocating pending funds selection works in much the same manner as the allocating available funds selection outlined above. After the advertiser chooses to allocate pending funds, a routine is invoked to display current pending balances for the account and the subaccounts. The advertiser distributes the pending subaccount balances between campaigns and submits a request to update the balances. A function is invoked which calculates and displays the current running totals for the pending subaccount balances. This function also validates the new pending subaccount allocations to make sure that the allocations do not exceed any authorized amount. The current running total of pending allocations is set to the sum of current pending balances for all subaccounts for the advertiser. If the new user-set pending subaccount balances or the total of such balances do not exceed any authorized amount, the function will update all of the pending subaccount allocations in the persistent state, e.g. the advertiser's account in the database, and display the update in read-only format.

A routine displaying the account management menu may be invoked from the advertiser main menu. Aside from the "Allocate Money Between Subaccounts" selection described above, the remaining selections all use to some extent the search listings present in the advertiser's account on the database, and may also affect the advertiser's entry in the search result list. Thus, a further description of the search result list generated by the search engine is needed at this point.

When a remote searcher accesses the search query page on the search engine server 404 and executes a search request according to the procedure described previously, the search engine server 404 preferably generates and displays a search result list where the "canonicalized" entry in search term field of each search listing in the search result list exactly matches the canonicalized search term query entered by the remote searcher. The canonicalization of search terms used in queries and search listings removes common irregularities of search terms entered by searches and web site promoters, such as capital letters and pluralizations, in order to generate relevant results. However, alternate schemes for determining a match between the search term field of the search listing and the search term query entered by the remote searcher are well within the scope of the present invention. For example, string matching algorithms known in the art may be employed to generate matches where the keywords of the search listing search term and the search term query have the same root but are not exactly the same (e.g., computing vs. computer). Alternatively a thesaurus database of synonyms may be stored at search engine web server 24, so that matches may be generated for a search term having synonyms. Localization methodologies may also be employed to refine certain searches. For example, a search for "bakery" or "grocery store" may be limited to those advertisers within a selected city, zip code, or telephone area code. This information may be obtained through a cross-reference of the advertiser account database stored at storage 32 on account monitoring server 402. Finally, internationalization methodologies may be employed to refine searches for users outside the United States. For example, country or language-specific search results may be generated, by a cross-reference of the advertiser account database, for example.

The "Account Management" menu also may provide advertisers with a "Project Expenses" selection. In this selection, the advertiser specifies a search listing or subaccount for which the advertiser would like to predict a "daily run rate" and "days remaining to expiration." The system calculates the projections based on a cost projection algorithm, and displays the predictions to the advertiser on a read-only screen. The predictions may be calculated using a number of different algorithms known in the art. However, since the cost of a search listing is calculated by multiplying the bid amount by the total number of clicks received by the search listing at that bid amount during a specified time period, every cost projection algorithm must generally determine an estimated number of clicks per month (or other specified time period) for a search listing. The clicks on a search listing may be tracked via implementation of a software counting mechanism as is well known in the art. Clicks for all search listings may be tracked over time, this data may be used to generate estimated numbers of clicks per month overall, and for individual search terms. For a particular search term, an estimated number of searches per day is determined and is multiplied by the cost of a click. This product is then multiplied by a ratio of the average number of clicks over the average number of impressions for the rank of the search listing in question to obtain a daily run rate. The current balance may be divided by the daily run rate to obtain a projected number of days to exhaustion or "expiration" of account funds.

In an embodiment, the cost projection algorithm is based on a simple predictor model that assumes that every search term performs in a similar fashion. This model assumes that the rank of the advertiser's search listing will remain constant and not fluctuate throughout the month. This algorithm has the advantages of being simple to implement and fast to calculate. The predictor model is based on the fact that the click through rate, e.g. the total number of clicks, or referrals, for a particular searcher listing, is considered to be a function of the rank of the search listing. The model therefore assumes that the usage curve of each search term, that is, the curve that result when the number of clicks on a search listing is plotted against the rank of the search listing, is similar to the usage curve for all search terms. Thus, known values extrapolated over time for the sum of all clicks for all search terms, the sum of all clicks at a given rank for all search terms, and the sum of all clicks for the selected search term may be employed in a simple proportion to determine the total of all clicks for the given rank for the selected search term. The estimated daily total of all clicks for the selected search term at the selected rank is then multiplied by the advertiser's current bid amount for the search term at that rank to determine a daily expense projection. In addition, if particular search terms or classes of search terms are known to differ markedly from the general pattern, correction values specific to the search term, advertiser, or other parameter may be introduced to fine-tune the projected cost estimate.

Finally, the "Account Management" menu may provide several selections to view information related to the advertiser's campaigns. The "View Subaccount Information" selection displays read-only information related to the selected subaccount. The "View Search Term List" selection displays the list of the advertiser's selected search terms along with the corresponding URLs, bid price, and rank, with the search terms preferably grouped by subaccount. The advertiser may also view current top bids for a set of search terms selected from a list of search terms from a read-only display generated by the system upon receiving the requested search terms from the advertiser.

For an advertiser who requires a more comprehensive report of search listing activity, the "View Report" option may be selected from the Advertiser Main Page. In an embodiment of the present invention, the "View Report" options generate reports comprehensive for up to one year preceding the current date. For example, daily reports are available for the each of the immediately preceding 7 days, weekly reports for the preceding four weeks, monthly reports for the preceding twelve months, and quarterly reports for the last four quarters. Additional reports may also be made available depending on advertiser interest. Other predefined report types may include activity tracked during the following time periods: Since Inception of the Account, Year To Date, Yearly, Quarter To Date, Month To Date, and Week to Date. Report Categories may include a Detail Report, viewable by Advertiser Account, by Search Listing, and by URL, and a Summary Report, viewable by Advertiser Account and by Subaccount. The reports may include identification data such as advertiser account and subaccount name, the dates covered by the report and the type of report. In addition, the reports may include key search listing account data such as current balance, pending current balance, average daily account debit, and run rate. Furthermore, the reports may also include key data, such as: search terms, URLs, bids, current ranks, and number of clicks, number of searches done for the search term, number of impressions (times that the search listing appeared in a search result list), and click through rate (defined as Number of Clicks/Number of Impressions). Preferably, the report is available in at least HTML view options for viewing via a browser program, printing, or downloading. Note, however, that other view options may be made available, such as Adobe Acrobat, PostScript, ASCII text, spreadsheet interchange formats (e.g., CSV, tab-delimited), and other well-known formats.

When the advertiser has selected the "View Report" option, the system invokes a function which displays a list of available report types, dates, categories, and view options. The system preferably creates a report instance with the following fields, all of which are initially set to null: report type, report date, report category, and view option. Once the advertiser has defined the parameters described above, the system invokes a function to generate the requested report, based on the advertiser-set parameters, and to display the report, based on the view option parameter.

XI. Agent Execution Cycling

Figure 5:
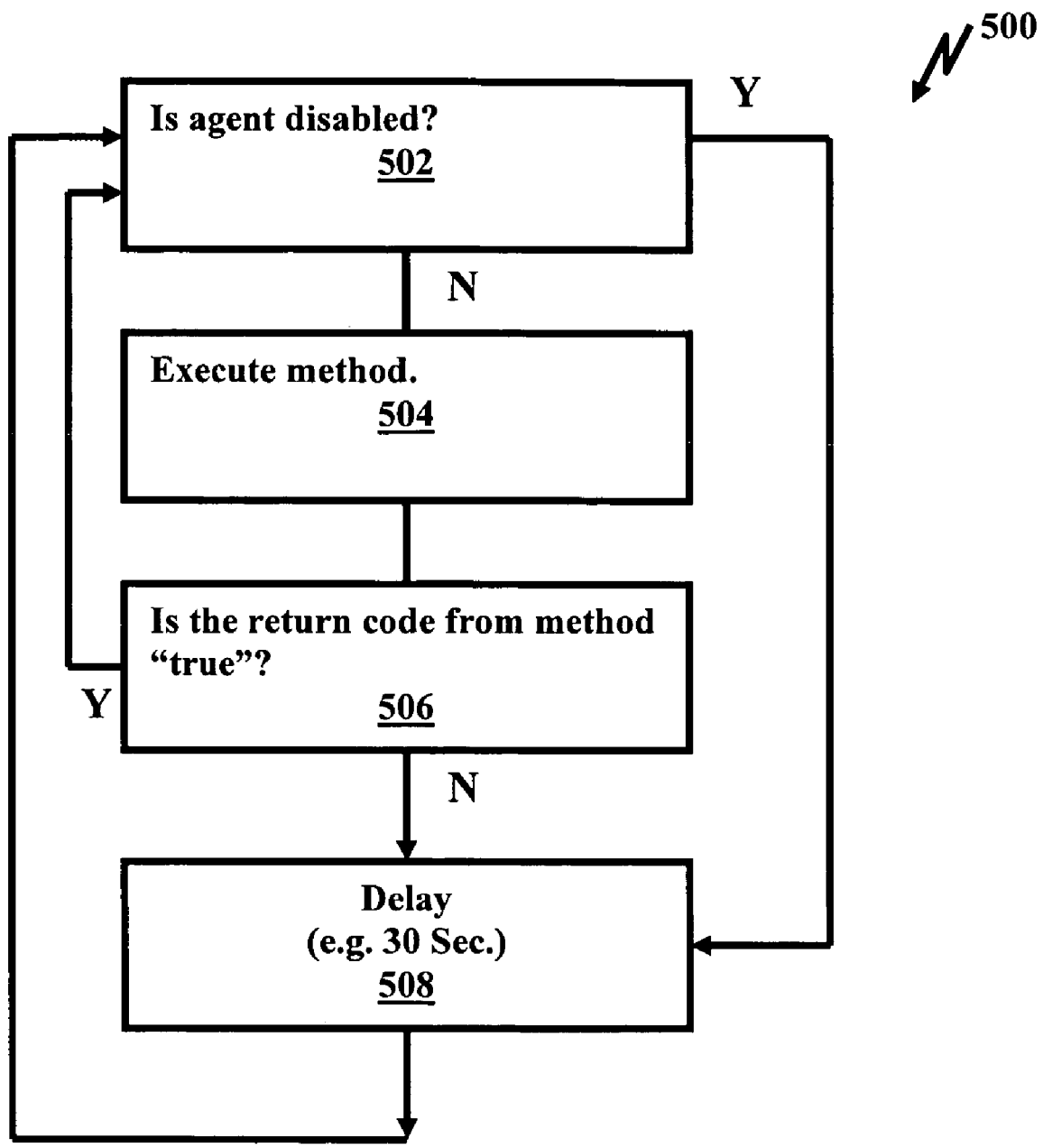
FIG. 5 is a flow chart illustrating a method of executing the various agents in an account monitor system.

FIG. 5 is a flow diagram of a typical agent execution 500. Multiple agents may be executed simultaneously. The agents describe in reference to FIG. 1, including the bulk adjustment agent 122, the account aging agent 124, the search listing agent 126, the auto charge agent 128, the fixed budget agent 130, the reconciled balance agent 132, the real-time click agent 134, and the CTP agent 136. The agent execution 500 may be executed on different physical computers or on a single computer. In block 502, the agent determines its status. The status may be, for example, disable or enabled. If the agent's status is disabled, then the agent enters a delay 508 before checking its status 502 again. If the agent is enabled, the method is executed 504. Each agent may be associated with one or more methods, such that every time the agent is enable and run, those method(s) are executed. When the method completes some or all of its tasks, the method will return a recode, for example "true" or "false." Other return codes may also be returned by the agent. In block 506, the return code from method is checked to see if the method needs to be executed a second time. The method may need to be executed again because it did not completed all of its tasks. For example, a method may need to enter an account entry and have it committed to the books, which requires ending the method's process. Then the method needs to perform a task on that committed entry. In an illustrative example, a return code of "true" indicates that the method needs to be executed again before the agent enters the delay 508. In block 508, the agent waits for a specified delay time before cycling through the agent execution 500 an again. The delay may be any value, for example 30 Second.

XII. Method of Determining Definitive Click Charges

Figure 6:
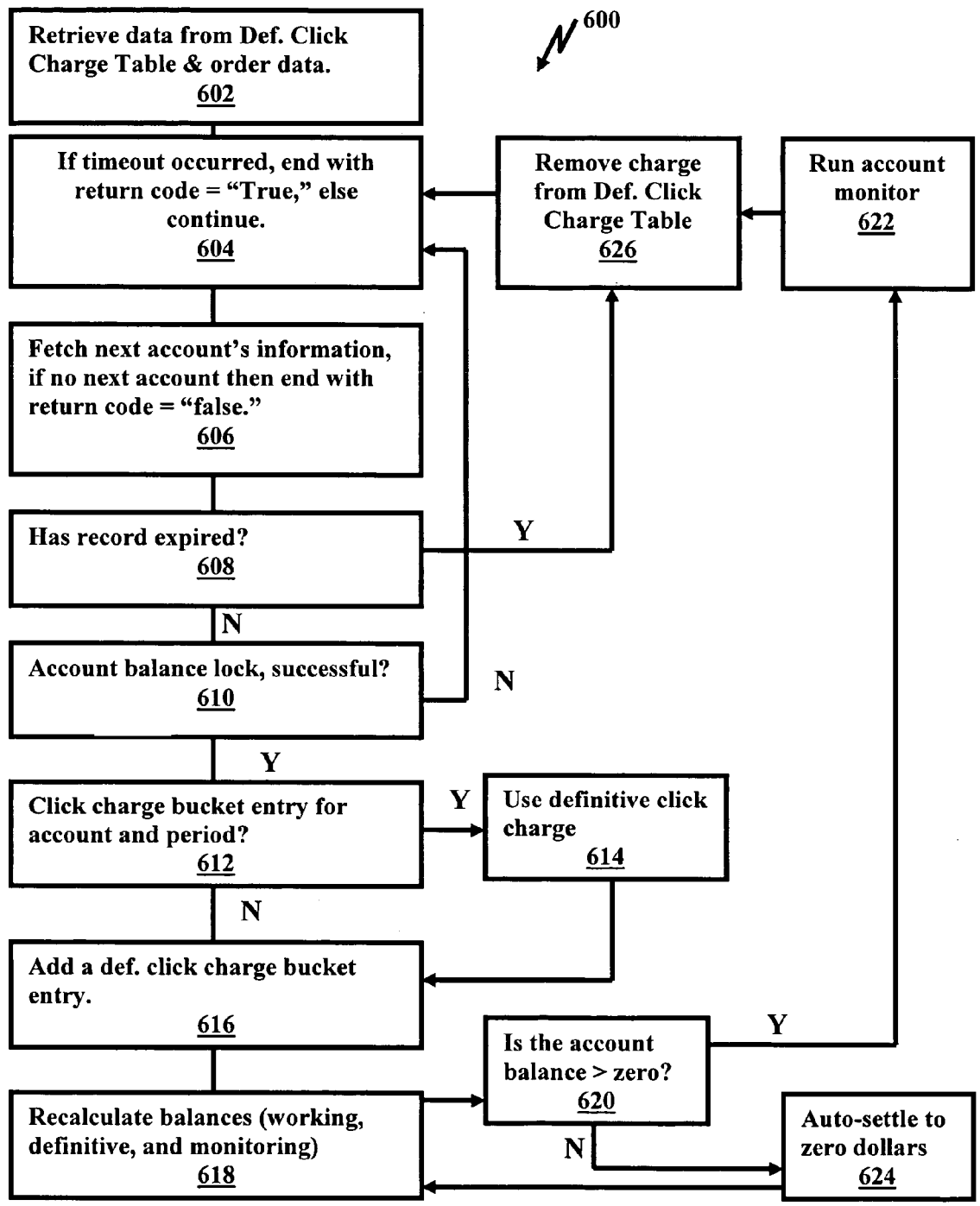
FIG. 6 is a flow chart illustrating a method of determining definitive click charges in an account monitor system.

FIG. 6 is a flow diagram that illustrates a method 600 of determining definitive click charges. The CTP agent 136 (FIG. 1) may call the account service 930 (FIG. 9) to perform the method 600 of determining definitive click charges. In block 602, data is retrieved from the definitive click charge table. The data is then ordered, for example by start time and account ID. In block 604, if a timeout condition occurred, the agent is terminated and a return code of "True" is returned. In block 606, the information for the next account is fetched. If there is no next account, then the agent is ended and a return code of "false" is provided. In block 608, if the record has expired then block 626 is executed, otherwise block 610 is executed. In block 610, the account balance is locked. If the account balance lock is not successful then block 604 is executed, otherwise block 612 is executed. In block 612, if a click charge bucket entry for the account and the current period exists then block 614 is executed, otherwise block 616 is executed. In block 614, a definitive click charge bucket entry is added to replace the existing entry. The definitive click charge bucket entry may include the click charge amount for the current account and time period. In block 616, a definitive click charge bucket entry is added. In block 618, the various balances are recalculated. The balances may include the working balance, definitive balance, and monitoring balances. In block 620, the account balance is checked to determine if it is sufficient. For example, if the account is a prepaid account with a fixed budget or a prepay deposit account and the account has a definitive balance is greater than zero. If the balance is sufficient, then block 622 is executed. If the balance is not sufficient, then block 624 is executed. In block 624, an auto-settlement transaction is created to bring the definitive balance to zero dollars and the auto-settlement flag is set to "off." In block 622, the account monitor is executed. The account monitor may be the account monitor described with reference to FIG. 3 above. In block 626, the charge is removed from the definitive click charge table.

XIII. Method of Accounting for Click Results

Figure 7:
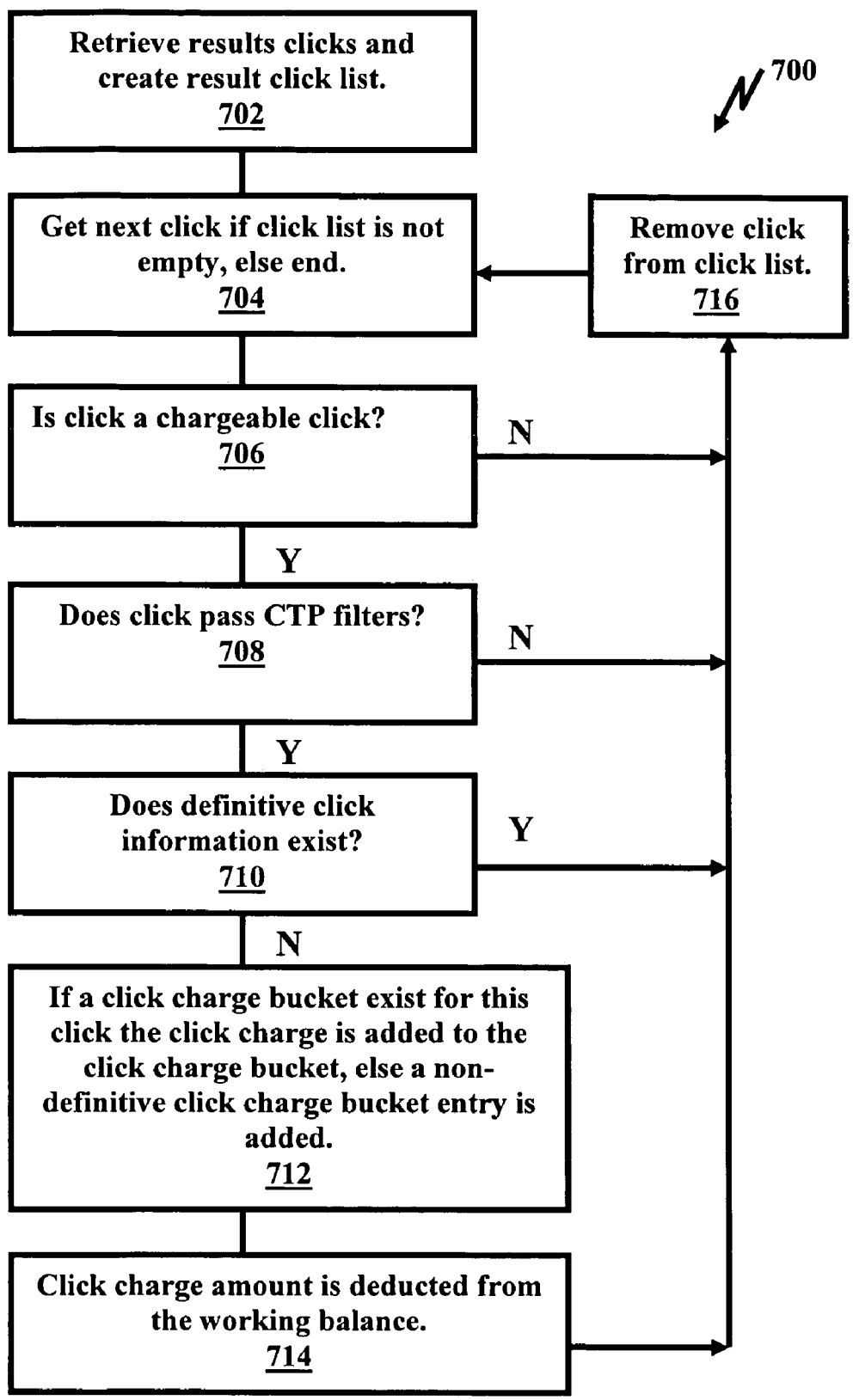
FIG. 7 is a flow chart illustrating a method of accounting for click results in an account monitor system.

FIG. 7 illustrates a method 700 of accounting for click results. The realtime click agent 134 (FIG. 1) may call the account balance service 930 (FIG. 9) to perform the method 700 of accounting for click results. In block 702, entries from the results clicks queue are retrieved, for example the results click queue entries may be retrieved in groups of ten. Then a result click list is generated and may be ordered by account ID. In block 704, the next click from the click list is retrieved. If the result click list is empty then the method is terminated and a return code of "True" is returned.

In block 706, the click is screened to determine if it is a chargeable click. A click that is not chargeable may be a duplicate click, for example as a result of a users clicking twice on a listed link. Other types of non-chargeable clicks may be clicks generated at the search engine provider's location for test and debug purposes. In block 708, the click is screened to determine if it is a fraudulent click. Multiple filters may be used to detect fraudulent clicks. The filters may be run on different subsets of data and at different times. For example, the filters may include a memory-based CTP filter, a network-based CTP filter, a database-based CTP filter, and others. For example, multiple clicks that have the same session ID and the same resource ID are considered duplicates and multiple clicks with the same search ID and the same resource ID are considered duplicate clicks. A session ID identifies a user's session with a search engine and may be a 64 bit code. A resource ID identifies the target web site and may be the target web site's URL. A search ID identifies the search.

In block 710, if definitive click information exist then block 716 is executed, otherwise block 712 is executed. In block 712, if a click charge bucket exist for this click, the click charge is added to the click charge bucket, otherwise a non-definitive click charge bucket entry is added. In block 714, the click charge amount is deducted from the working balance. In block 716, the click is removed from click list.

XIV. Method of Reconciling Balances

Figure 8:
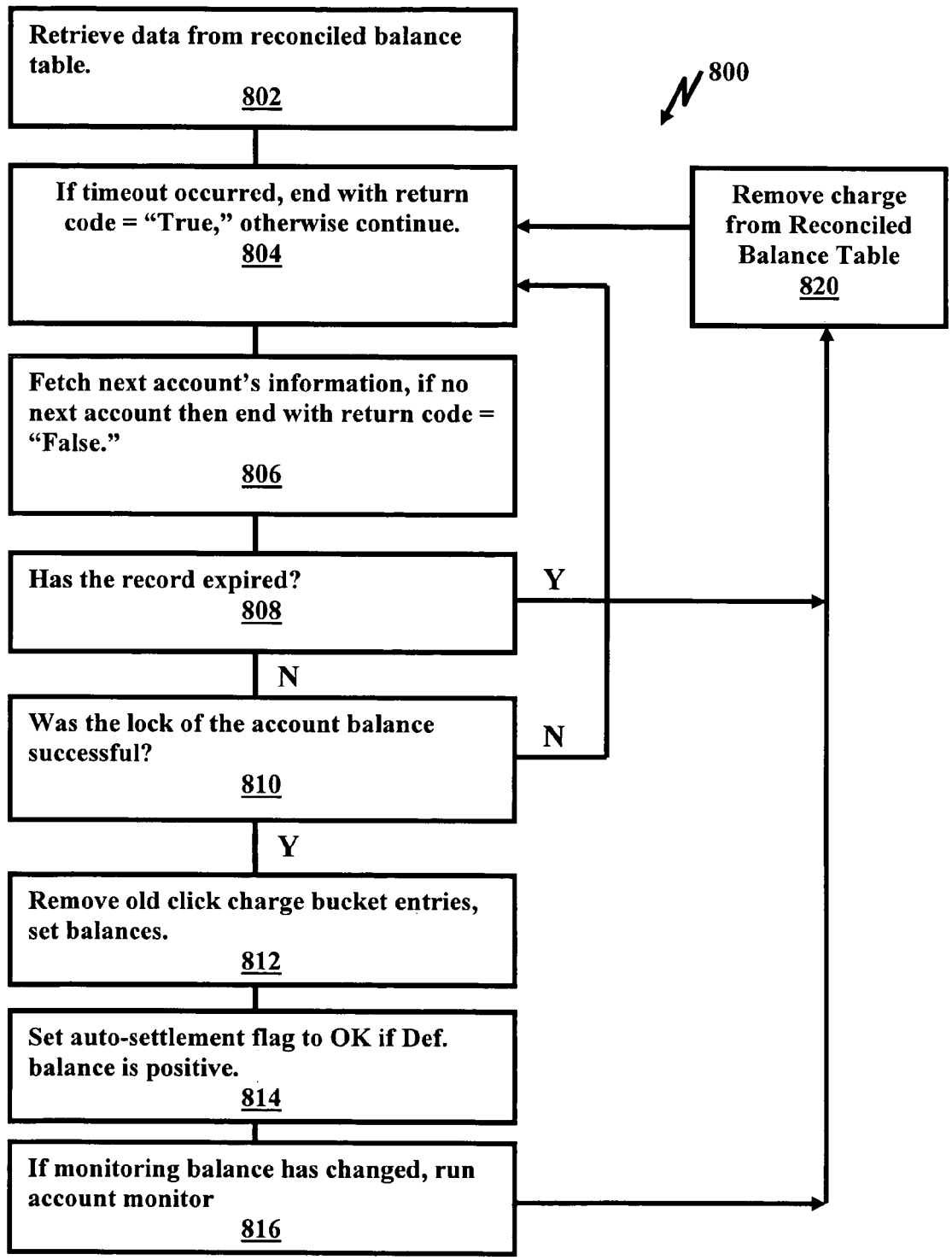
FIG. 8 is a flow chart illustrating a method of reconciling balances in an account monitor system.

FIG. 8 illustrates a method 800 of reconciling balances. The reconcile balance agent 132 (FIG. 1) may call the account balance service 930 (FIG. 9) to perform the method 800 of reconciling balances. In block 802, data is retrieved from the reconciled balance table. In block 804, if a timeout condition has occurred, the method 800 is terminated and a return code of "True" is returned. If no timeout condition exists then block 806 is executed. In block 806, the information for the next account is fetched. If no next account exists then the method 800 ends with a return code of "False." If a next account does exist, block 808 is then executed. In block 808, whether the record has expired is determined. If the record has expired block 820 is executed. If the record has not expired then block 810 is executed. In block 810, the account balance is locked. If the account balance is not locked successfully, block 804 is executed. If the account balance is locked successfully, block 812 is executed. In block 812, this account's click charge bucket entries dated before the most recent click charge time stamp are remove from the click charge bucket. The various balances are adjusted. The balances may include the reconciled balance, the working balance, the definitive balance and the monitoring balance. In block 814, the auto-settlement flag is set to "OK" if the definitive balance is positive and the auto-settlement flag is set to "OFF." In block 816, the account monitor is run if the monitoring balance changed. In block 820, the charge is removed from the reconciled balance table then block 804 is executed.

XV. Services

Figure 9:
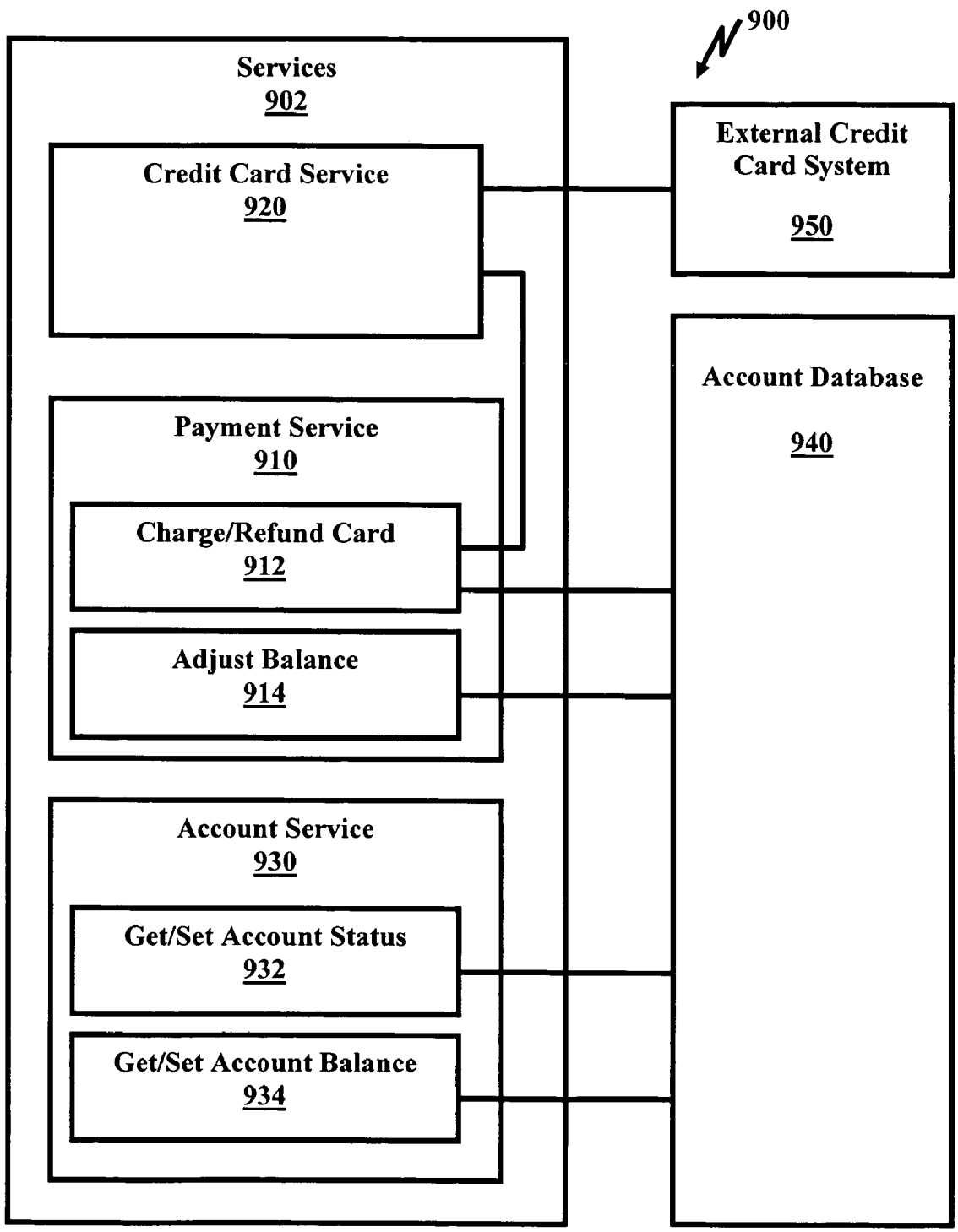
FIG. 9 is a block diagram illustrating some account monitoring services.

FIG. 9 is a block diagram of a system 900 including the account monitor services 902. The services 902 include the payment service 910, the credit card service 920, and the account service 930. The payment service 910 includes sub-services such as charge/refund card 912 and adjust balance 914. The adjust balance 914 sub-service may add or deduct funds in an account in the account database 940. The charge/refund card 912 sub-service interfaces with the credit card service 920 to get or pay funds to and from a user's credit card account via an external credit card system 950. The external credit card system 950 may any credit card system including CyberSource®, Wells Fargo®, or others. The credit card service 920 may process information from the payment service 910 and format and configure the information for each of the particular external credit card system 950. The account services sub-service 930 allows a customer service representative to get or set an account status 932 and get and set an account balance 934 from the account database 940. When the services 902 perform a task that might change the account status, the account monitor is executed to evaluate the account status.

XVI. Optional Account Adjustments for Taxes

An account may be adjusted for various taxes, such that the net effect on the user's account is tax adjusted. If a user's account is subject to taxation, the tax may be applied at the time of deposit or at the time of invoice. Prepay accounts typically have the taxes applied when funds are deposited. Invoice accounts typically have the taxes applied when the invoice is prepared. Such tax adjustments may be useful in countries with value added taxes (VAT) such as Britain.

For accounts that have taxes applied upon deposit of funds, the amount charged to the customer's account will be the amount desired to be deposited plus the amount of the taxes. For example, if a customer wishes to deposit $100 and the tax is 17.5%, the customer's account, for example the customer's credit card account, will be charged $117.5. The taxes may be federal, state, or local taxes, including sales taxes or other types of taxes. The various balances, including the working balance, the definitive balance, and the reconciled balance, are then increased by the amount deposited. As charges for that account accrue, for example click charges, the various balances are reduced by the charges without consideration for taxes.

For accounts that have taxes applied upon being invoiced, the various balances are reduced by the tax adjusted charges. For example, if $10 of click charges are accrued and the account has a 17.5% tax, the various balances for that account will be reduced by $11.75. The various balances may include the monitoring balances.

The foregoing detailed description should be regarded as illustrative rather than limiting and the appended claims, including all equivalents, are intended to define the scope of the invention.

The invention claimed is:

1. A method of generating an ordered search list via a search engine, the method comprising:
   in response to a search request from a searcher, retrieving from a database of search listings matching the search request, at least some of the retrieved search listings being associated with an advertiser's account such that the advertiser's account is charged an amount if a chargeable event occurs in connection with a search listing of the advertiser;
   determining a reconciled account balance for the advertiser's account based on a difference between deposits and a set of current chargeable event charges;
   ordering the retrieved search listings into a search result list using priced amounts associated with the retrieved search listings, including ordering the retrieved search listings associated with advertisers with reconciled balances that are below a reconciled threshold if priced amount for a given search term was zero;
   ordering the retrieved search listings if the priced amount for the given search term was above zero and below all other non-zero priced amounts in the ordered search result list to reduce over-delivery of the search listings and reduce over-billing of competing advertisers;
   providing the ordered search result list to the searcher; and
   assessing charges to the advertiser's account based on the searcher's selection of a search listing from the search result list, including deducting an event charge amount from the account balance for the advertiser's account after eliminating from result event list events which are non-chargeable events or fraudulent events.

2. A system for generating an ordered search list via a network search engine, the system comprising:
   a memory;
   a search engine server comprising circuitry that stores in a search database of the memory, data defining search listing records used to generate search results in response to a user query, each search listing record being associated with a network location and a respective priced amount;
   an account monitoring server comprising circuitry that stores, to an account database, account information associated with search listings records;
   the account monitoring server also comprises circuitry that determines an account balance for an account in the account database,
   determines a reconciled balance for an account based on a difference between deposits and current chargeable event charges for the account to deduct event charge amounts from the account balance for the account upon an occurrence of a predetermined event for a search listing associated with the account, and
   eliminates event charge amounts which are non-chargeable to the account;
   retrieves from a database search listings matching the user query, at least some of the retrieved search listings being associated with an advertiser's account such that the advertiser's account is charged an amount if a chargeable event occurs in connection with a search listing of the advertiser; and
   generates an ordered search result list including the retrieved search listings from the search results from database, the search results which the account balance determined by the account monitoring server is above a threshold,
   wherein the search engine server orders the retrieved search listings in the ordered search result list based on respective priced amounts of the ordered search listings, the search engine server also orders the retrieved search listings which a reconciled account balance does not exceed a reconciled threshold if the respective priced amount for a given search term was zero, and orders the retrieved search listings if the respective priced amount for a given search term was above zero and below all other non-zero priced amounts in the ordered search result list to reduce over-delivery of the retrieved search listings and reduce over-billing of competing advertisers.

* * * * *